United States Patent
Date et al.

(10) Patent No.: US 11,322,102 B2
(45) Date of Patent: May 3, 2022

(54) DISPLAY DEVICE AND DISPLAY METHOD REPRODUCING KINEMATIC PARALLAX FOR EXPRESSING HIGH SENSE OF REALISM

(71) Applicant: NIPPON TELEGRAPH AND TELEPHONE CORPORATION, Tokyo (JP)

(72) Inventors: Munekazu Date, Musashino (JP); Megumi Isogai, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/260,552

(22) PCT Filed: Jun. 21, 2019

(86) PCT No.: PCT/JP2019/024825
§ 371 (c)(1),
(2) Date: Jan. 15, 2021

(87) PCT Pub. No.: WO2020/017241
PCT Pub. Date: Jan. 23, 2020

(65) Prior Publication Data
US 2021/0280145 A1    Sep. 9, 2021

(30) Foreign Application Priority Data
Jul. 18, 2018    (JP) .............................. JP2018-135279

(51) Int. Cl.
*G09G 3/36*    (2006.01)
*H04N 13/324*    (2018.01)
*H04N 13/312*    (2018.01)

(52) U.S. Cl.
CPC ......... *G09G 3/3607* (2013.01); *H04N 13/312* (2018.05); *H04N 13/324* (2018.05); *G09G 2300/0465* (2013.01)

(58) Field of Classification Search
CPC ......... G09G 3/3607; G09G 2300/0465; H04N 13/324; H04N 13/312
(Continued)

(56) References Cited

U.S. PATENT DOCUMENTS

| 2003/0164912 A1* | 9/2003 | Eguchi | ............... G02F 1/133345 349/113 |
| 2006/0192776 A1* | 8/2006 | Nomura | ............... H04N 13/139 345/419 |

(Continued)

FOREIGN PATENT DOCUMENTS

| JP | 2010282098 A | 12/2010 |
| JP | 2015121748 A | 7/2015 |
| JP | 2016161912 A | 9/2016 |

OTHER PUBLICATIONS

Munekazu Date et al., Full Parallax Visually Equivalent Light Field 3D Display Using Linear Blending, IMID 2017/3DSA Digest, 2017, p. 521.

(Continued)

*Primary Examiner* — Jonathan M Blancha
(74) *Attorney, Agent, or Firm* — Kenja IP Law PC

(57) ABSTRACT

A display device and a display method which can reproduce kinematic parallax and express a high sense of realism without using image display means are provided. The display device includes an image display unit having a stripe structure having subpixels of a plurality of colors disposed so that subpixels of the same color are arranged in a first direction and enabling an observer to observe, through an aperture, an image formed by pixels, each pixel being constituted by the subpixels of a plurality of colors. The (Continued)

aperture has a shape in which areas of the subpixels of the plurality of colors which can be seen through the aperture are uniform, and in which a numerical aperture decreases along a second direction orthogonal to the first direction. A plurality of the apertures are provided so as not to overlap with each other.

10 Claims, 20 Drawing Sheets

(58) Field of Classification Search
USPC .......................................................... 345/87
See application file for complete search history.

(56) References Cited

U.S. PATENT DOCUMENTS

| 2011/0109623 | A1* | 5/2011 | Relke | G02B 30/27 |
| | | | | 345/419 |
| 2011/0234582 | A1* | 9/2011 | Daiku | G02B 30/27 |
| | | | | 345/419 |
| 2012/0182407 | A1* | 7/2012 | Yoshida | H04N 13/31 |
| | | | | 348/54 |
| 2018/0125340 | A1* | 5/2018 | Ishikawa | A61B 1/00193 |

OTHER PUBLICATIONS

Sep. 3, 2019, International Search Report issued in the International Patent Application No. PCT/JP2019/024825.

* cited by examiner

FIG. 6

|   |     | px0 | 24  |     |   |   |
|---|-----|-----|-----|-----|---|---|
| R | Rlu | Ru  | Rru | R   | R |
| G | Glu | Gu  | Gru | G   | G |
| B | Blu | Bu  | Bru | B   | B |
| R | Rl  | R0  | Rr  | R   | R |
| G | Gl  | G0  | Gr  | G   | G |
| B | Bl  | B0  | Br  | B   | B |
| R | Rlb | Rb  | Rrb | R   | R |
| G | Glb | Gb  | Grb | G   | G |
| B | Blb | Bb  | Brb | B   | B |
| R | R   | R   | R   | R   | R |
| G | G   | G   | G   | G   | G |
| B | B   | B   | B   | B   | B |

SECOND DIRECTION ↑

FIRST DIRECTION →

| 00 | 10 | 20 | 00 | 10 | 20 | 00 | 10 | 20 |
| 01 | 11 | 21 | 01 | 11 | 21 | 01 | 11 | 21 |
| 02 | 12 | 22 | 02 | 12 | 22 | 02 | 12 | 22 |
| 00 | 10 | 20 | 00 | 10 | 20 | 00 | 10 | 20 |
| 01 | 11 | 21 | 01 | 11 | 21 | 01 | 11 | 21 |
| 02 | 12 | 22 | 02 | 12 | 22 | 02 | 12 | 22 |

SECOND DIRECTION ↑
FIRST DIRECTION →

SECOND DIRECTION ↑
FIRST DIRECTION →

DISPLAY DEVICE AND DISPLAY METHOD REPRODUCING KINEMATIC PARALLAX FOR EXPRESSING HIGH SENSE OF REALISM

TECHNICAL FIELD

The present invention relates to a display device and a display method.

BACKGROUND ART

In display devices, smoothly reproducing kinematic parallax (changes in appearance depending on the position of observation) is important for expressing a high sense of realism. The "multi-view 3D display" format is an example of a format capable of expressing kinematic parallax. However, with the multi-view 3D display format, changes arise between visual areas. The super multi-view 3D display format, the high-density directional display format, and the like, which improve the directional density of multi-view 3D displays, are examples of other formats capable of expressing kinematic parallax. However, with these formats, an extremely large amount of data is provided to the display device.

Accordingly, PTL 1 and PTL 2 disclose display techniques which interpolate between viewpoints. According to these techniques, continuous kinematic parallax is provided with a small number of images by performing linear blending, in which the luminance ratio of a plurality of images is changed smoothly, as the viewpoint moves.

NPL 1 discloses a technique in which continuous kinematic parallax is reproduced in a small device by combining a liquid crystal panel and an optical barrier. According to this technique, linear blending is realized in both the vertical direction and the horizontal direction by dividing the pixels in the liquid crystal panel into 3×3 subpixels, distributing subpixels of three primary colors uniformly in a checkerboard pattern, and having the liquid crystal panel be observed through quadrangular openings provided in the optical barrier.

CITATION LIST

Patent Literature

[PTL 1] Japanese Patent Application Publication No. 2015-121748
[PTL 2] Japanese Patent Application Publication No. 2016-161912

Non Patent Literature

[NPL 1] M. Date, H. Fujii, H. Kimata, "Full Parallax Visually Equivalent Light Field 3D Display Using Linear Blending", IMID 2017/3DSA Digest, pp. 521 (2017)

SUMMARY OF THE INVENTION

Technical Problem

With the techniques disclosed in PTL 1 and PTL 2, linear blending is performed on a plurality of images using a projection-type optical system, which increases the size of the device and limits the device's applications.

With the technique disclosed in NPL 1, a liquid crystal panel having a special pixel structure, namely one in which three primary color subpixels are arranged in a checkerboard pattern, is used, which increases the cost. Furthermore, each pixel is divided into 3×3 subpixels, which increases the number of subpixels; this causes problems when driving the pixels, which leads to a drop in resolution. Attempting to maintain the resolution requires an increase in wiring, a greater number of driving transistors, and the like, which causes a major decrease in the numerical aperture of the panel; this makes the display darker, and in high-resolution displays, diffraction caused by the pixel openings makes it impossible to perform linear blending correctly.

With the foregoing in view, it is an object of the present invention to provide a display device and a display method which can reproduce kinematic parallax and express a high sense of realism without using image display means having a special pixel structure and while suppressing an increase in the size of the device.

Means for Solving the Problem

To solve the above-described problem, a display device according to the present invention includes image display means having a stripe structure including subpixels of a plurality of colors disposed so that subpixels of the same color are arranged in a first direction, the image display means enabling an observer to observe, through an aperture, an image formed by pixels, each pixel being constituted by the subpixels of a plurality of colors. The aperture has a shape in which areas of the subpixels of the plurality of colors which can be seen through the aperture are uniform, and in which a numerical aperture decreases along a second direction orthogonal to the first direction. A plurality of the apertures are provided so as not to overlap with each other.

Additionally, to solve the above-described problem, a display method according to the present invention is a display method for a display device. The display device includes image display means, the image display means having a stripe structure including subpixels of a plurality of colors disposed so that subpixels of the same color are arranged in a first direction, and the image display means enabling an observer to observe, through an aperture, an image formed by pixels, each pixel being constituted by the subpixels of a plurality of colors. The aperture has a shape in which areas of the subpixels of the plurality of colors which can be seen through the aperture are uniform, and in which a numerical aperture decreases along a second direction orthogonal to the first direction. A plurality of the apertures are provided so as not to overlap with each other. The method includes displaying a pixel of an image from a prescribed viewpoint on a pixel observed when viewing through the aperture from the viewpoint.

Effects of the Invention

According to the display device and display method of the present invention, kinematic parallax can be reproduced and a high sense of realism can be expressed without using image display means having a special pixel structure and while suppressing an increase in the size of the device.

BRIEF DESCRIPTION OF DRAWINGS

FIG. 6 is a figure illustrating the principle of linear blending in the display device illustrated in FIG. 1.

DESCRIPTION OF EMBODIMENTS

An embodiment of the present invention will be described hereinafter with reference to the drawings.

Figure 1:
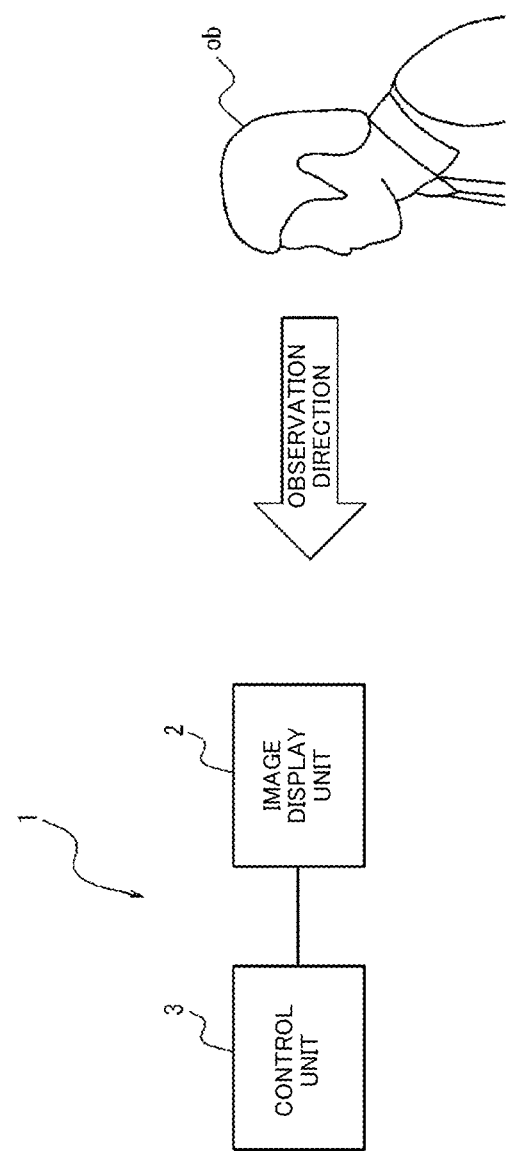
FIG. 1 is a figure illustrating the overall configuration of a display device according to an embodiment of the present invention.

FIG. 1 is a figure illustrating the overall configuration of a display device 1 according to an embodiment of the present invention. The display device 1 according to the present embodiment enables an observer ob to observe an image which varies in accordance with changes in an observation direction (viewpoint position).

The display device 1 illustrated in FIG. 1 includes an image display unit 2 and a control unit 3 that controls displays in the image display unit 2.

Figure 2A:
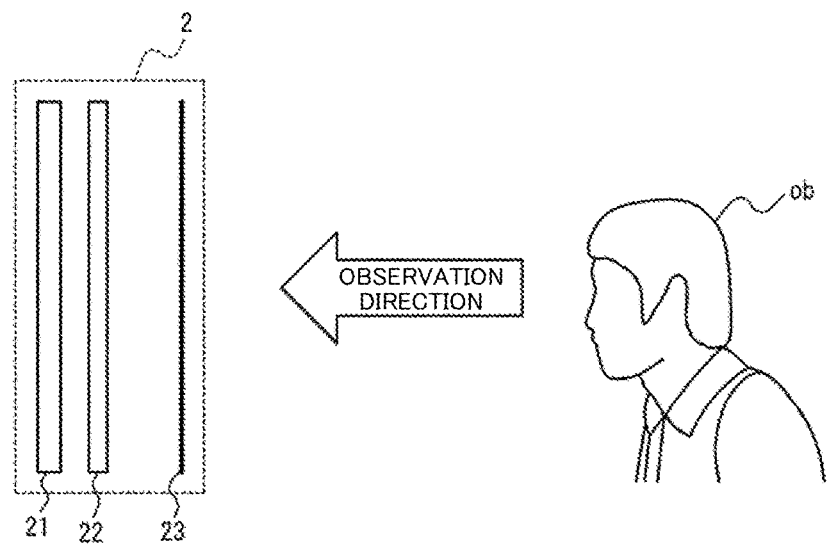
FIG. 2A is a figure illustrating an example of the configuration of an image display unit illustrated in FIG. 1.

The image display unit 2, which serves as image display means, has a stripe-shaped pixel configuration including subpixels of a plurality of colors, with subpixels of the same color being arranged in a prescribed direction, and enables an image formed by pixels constituted of a plurality of colors of subpixels to be observed by the observer ob. As illustrated in FIG. 2A, the image display unit 2 includes, for example, a backlight 21 constituted by a planar light source, a two-dimensional optical modulation element 22, and a barrier 23.

The two-dimensional optical modulation element 22 is provided in front of the backlight 21 as seen from the observer ob. The two-dimensional optical modulation element 22 has a configuration in which modulation elements which modulate light emitted from the backlight 21 are arranged two-dimensionally. A liquid crystal panel, for example, can be used as the two-dimensional optical modulation element 22.

The barrier 23 is provided in front of the two-dimensional optical modulation element 22 as seen from the observer ob. The barrier 23 allows some of the light emitted from the backlight 21 and modulated by the two-dimensional optical modulation element 22 to pass, and blocks some of that light. In other words, the barrier 23 limits the light observed by the observer ob.

The barrier 23 is provided with a plurality of apertures, with light being allowed to pass by the apertures and light being blocked by light-blocking part which is the area aside from the apertures. The barrier 23 is constituted by, for example, a plate-shaped member having a thickness that does not affect the observation of light passing through the apertures even when the observer ob views the image display unit 2 at an angle. The barrier 23 can be manufactured by, for example, punching holes corresponding to the shape of the apertures in a thin, light-blocking plate; forming a thin metal film in a pattern corresponding to the light-blocking part on a glass plate; or the like. Each aperture has an area equivalent (substantially equivalent) to a positive integral multiple of the area of one pixel. More specifically, each aperture allows the passage of light equivalent to the area of a block constituted by a pixels in the direction in which the subpixels are arranged and b pixels in a direction orthogonal to the direction in which the subpixels are arranged (a×b pixels) (this will be described in detail later). The following will describe a case where a=b=1, i.e., the blocks are 1×1 pixels, as an example.

In the configuration illustrated in FIG. 2A, the backlight 21 and the two-dimensional optical modulation element 22 may be configured as an integrated unit, and in such a case, a liquid crystal panel which modulates light entering from outside the display device or a liquid crystal display in which a backlight and a liquid crystal panel are integrated can be used, for example. An organic EL (Electro Luminescence) display or the like can be used as well.

Figure 2B:
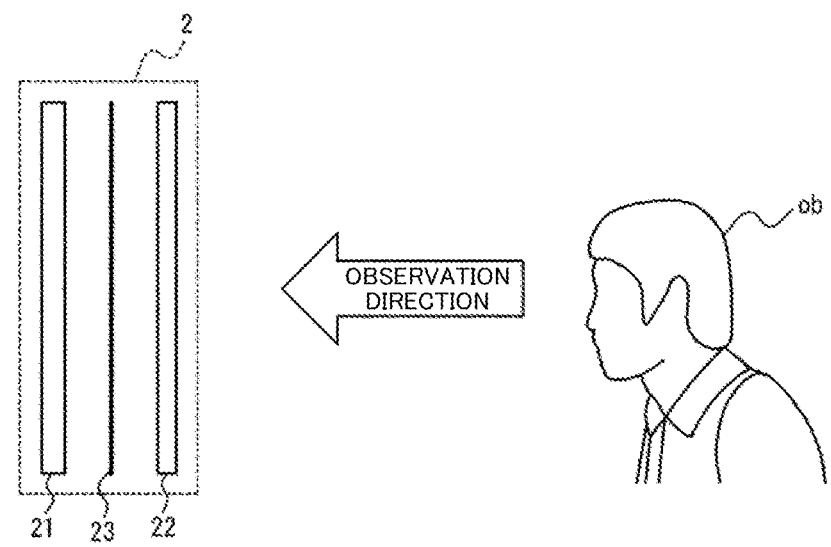
FIG. 2B is a figure illustrating another example of the configuration of the image display unit illustrated in FIG. 1.

Additionally, the image display unit 2 may be configured with the barrier 23 provided in front of the backlight 21 and the two-dimensional optical modulation element 22 disposed in front of the barrier 23 as seen from the observer ob, as illustrated in FIG. 2B. In this case, the light emitted from the backlight 21 and passing through the apertures in the barrier 23 is modulated by the two-dimensional optical modulation element 22 and observed by the observer ob.

In the configuration illustrated in FIG. 2B, the backlight 21 and the barrier 23 may be configured as an integrated unit. There are various types of such a configuration, such as a configuration in which light sources such as LEDs (Light-Emitting Diodes) are disposed only in positions corresponding to the apertures in the barrier 23 or a configuration in which a two-dimensional display displays a pattern corresponding to the apertures and the light-blocking part of the barrier 23, for example. A liquid crystal display, an organic EL display, or the like may be used as the stated two-dimensional display.

FIG. 2A and FIG. 2B illustrate a configuration in which the light emitted from the backlight 21, which is a planar light source, is modulated by the two-dimensional optical modulation element 22. A liquid crystal display is an example of a display having such a configuration. However, the display to which the present invention can be applied is not limited to a display including the backlight 21 and the two-dimensional optical modulation element 22, and an organic EL display or the like can be used as well, for example. Additionally, the backlight may be a directional light source, instead of a uniformly-distributed light source such as a Lambertian light distribution. In particular, using a light source having directionality with respect to the visual area of the display device makes it possible to improve the light usage efficiency and reduce power consumption. Furthermore, it goes without saying that the light usage efficiency may be further improved by providing a microlens array on the front surface of the backlight to focus light on the individual openings in the barrier.

As described above, with the image display unit 2 illustrated in FIG. 2A, the light, of the light emitted from the backlight 21 and modulated by the two-dimensional optical modulation element 22, which has passed through the apertures in the barrier 23, is observed by the observer ob. With the image display unit 2 illustrated in FIG. 2B, the light, of the light emitted from the backlight 21, which has passed through the apertures in the barrier 23, is modulated by the two-dimensional optical modulation element 22 and observed by the observer ob. Thus with the image display unit 2 according to the present embodiment, the light that has passed through the apertures is observed by the observer ob. As described above, a plurality of apertures, through each of which at least one pixel's worth of light has passed, are provided in the barrier 23. As such, the image display unit 2 according to the present embodiment enables the observer ob to observe, through the plurality of apertures, an image formed by pixels constituted by subpixels of a plurality of colors.

Note that in the present specification, "enables the observer ob to observe through the apertures" not only refers to enabling the observer ob to observe light that has passed through the apertures, but also includes enabling the observer ob to observe light that is substantially equivalent to light which has passed through the apertures. Accordingly, even with a configuration that does not necessarily include the barrier 23, such as a configuration in which light sources such as LEDs are disposed only in positions corresponding to the apertures in the barrier 23 or a configuration in which a two-dimensional display displays a pattern corresponding to the apertures and the light-blocking part of the barrier 23, light that is substantially equivalent to light which has passed through the apertures is observed by the observer ob. Thus in the present specification, "enable the observer ob to observe through the apertures" is assumed to include enabling the observer ob to observe an image using an image display unit 2 having these configurations as well.

Figure 3:
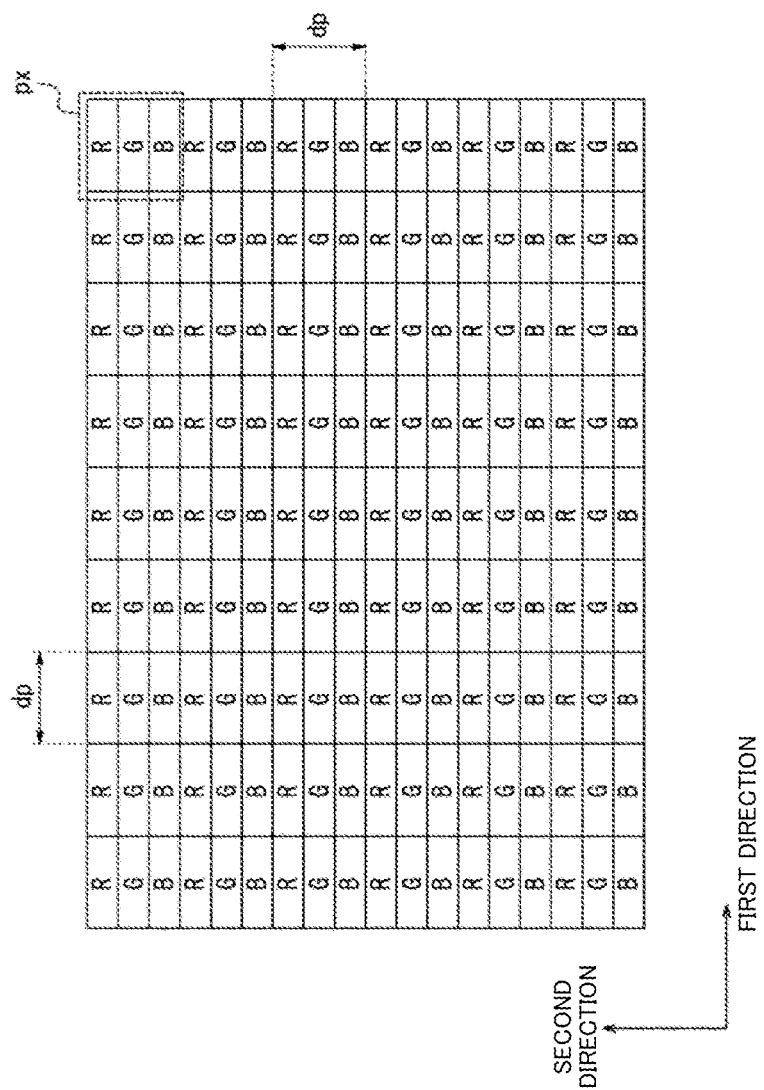
FIG. 3 is a figure illustrating a pixel configuration of the image display unit illustrated in FIG. 1.

FIG. 3 is a figure illustrating a pixel configuration in the two-dimensional optical modulation element 22. As described above, in the present embodiment, an organic EL display or the like which does not include the two-dimensional optical modulation element 22 can be used as the image display unit 2. As such, the pixel configuration described below will be described as a pixel configuration of the image display unit 2.

As illustrated in FIG. 3, the image display unit 2 has a stripe structure in which subpixels of a plurality of colors are disposed so that subpixels of the same color are arranged in a prescribed direction. FIG. 3 illustrates a structure in which subpixels of three primary colors, i.e., red (R), green (G), and blue (B), are disposed in stripe shapes. In the following, the direction in which subpixels of the same color are arranged (the horizontal direction in FIG. 3) will be called a "first direction" and a direction orthogonal to the first direction (the vertical direction in FIG. 3) will be called a "second direction".

One pixel px is constituted by three subpixels, namely a red subpixel R, a green subpixel G, and a blue subpixel B, arranged in the second direction. Each of the red subpixel R, the green subpixel G, and the blue subpixel B has an elongated shape in which the width in the first direction is greater than the width in the second direction. In the present embodiment, the subpixels are arranged so that the lengthwise directions thereof are parallel to the first direction. The following descriptions will assume that the pixel pitch is dp in both the first direction and the second direction, i.e., that the widths of the pixels is dp in the first direction and the second direction (square pixels). However, the shape of the pixel px may be elongated horizontally, in the first direction, or elongated vertically, in the second direction. Additionally, although FIG. 3 illustrates an example in which the direction in which subpixels of the same color are arranged is the horizontal direction (horizontal stripes), the configuration is not limited thereto. As will be described later, in the present embodiment, linear blending can be performed in both the vertical direction and the horizontal direction by causing an image to be observed through the apertures in the barrier 23. Accordingly, the direction in which subpixels of the same color are arranged can be at any angle, as long as the barrier 23 is rotated accordingly.

Figure 4:
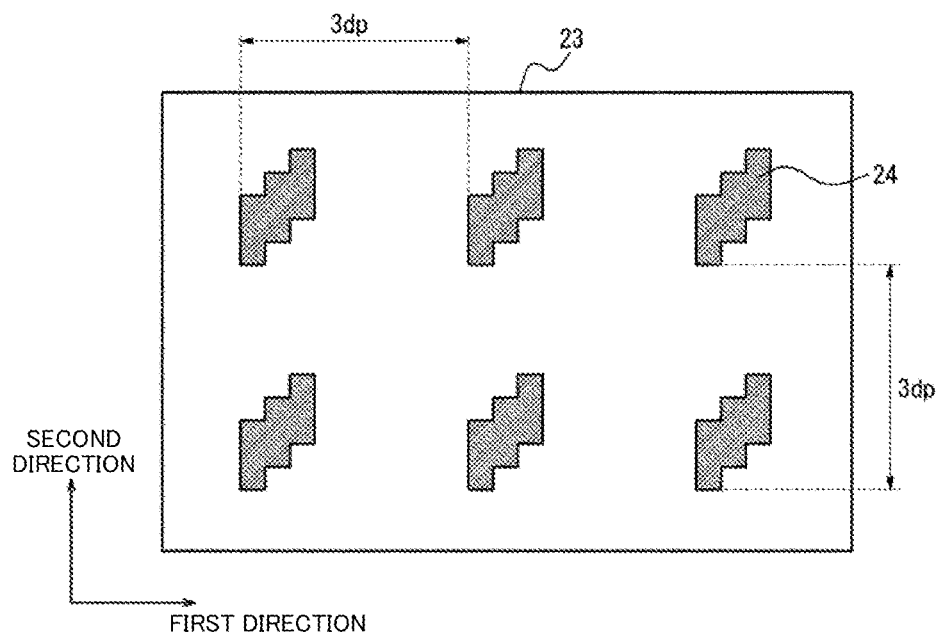
FIG. 4 is a figure illustrating an example of the configuration of a barrier illustrated in FIGS. 2A and 2B.

FIG. 4 is a figure illustrating an example of the configuration of the barrier 23. In the following, the apertures in the barrier 23 are indicated by the hatching sloping upward to the right, and the light-blocking part aside from the apertures is indicated by solid white.

As illustrated in FIG. 4, the barrier 23 has a plurality of apertures 24. The plurality of apertures 24 are provided so as not to overlap with each other. More specifically, the apertures 24 are disposed at intervals of three pixels (3dp) in both the first direction and the second direction. Although FIG. 4 illustrates an example of the configuration of the barrier 23 in which the apertures 24 are disposed at the same intervals in both the first direction and the second direction, the configuration is not limited thereto. The apertures 24 may be disposed at intervals that are different in the first direction and the second direction. Additionally, it is sufficient for at least two apertures 24 to be provided.

Figure 5:
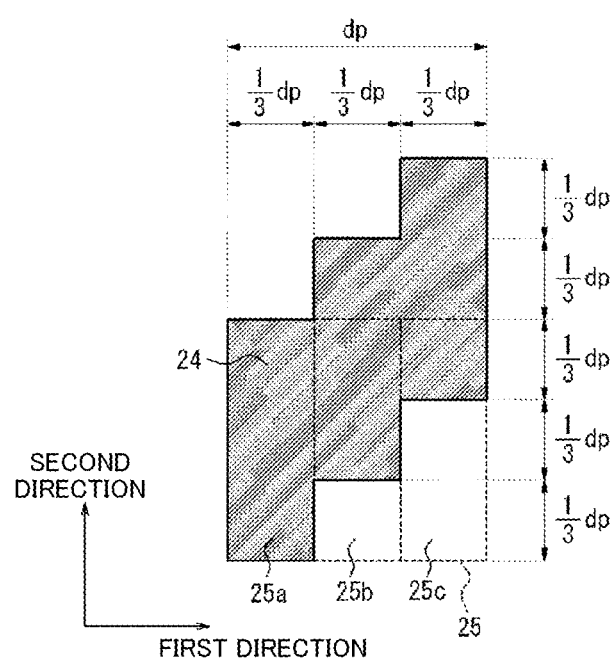
FIG. 5 is a figure illustrating an example of the shape of apertures in the barrier illustrated in FIGS. 2A and 2B.

FIG. 5 is a figure illustrating an example of the shape of the apertures 24. As described above, each of the apertures 24 has an area equivalent to a positive integral multiple of one pixel. In FIG. 5, each of the apertures 24 is illustrated as having an area equivalent to one pixel. Furthermore, the following assumes that the width of each subpixel in the second direction is d (=(⅓)dp).

First, consider a hypothetical opening 25 which, like a single pixel that is a square pixel, has a width of dp in both the first direction and the second direction. The opening 25 is then divided in the second direction by the same number as there are colors of subpixels (3, in the present embodiment). In other words, the opening 25 is divided into an opening 25a, an opening 25b, and an opening 25c, in that order in the first direction. The aperture 24 has a shape achieved by shifting the openings 25b and 25c in the second direction relative to the openings adjacent on the left thereof by one subpixel color's worth of the pixel pitch dp ((⅓)dp). As such, the aperture 24 has a shape achieved by shifting the opening 25b by (⅓)dp in the second direction and shifting the opening 25c by (⅔)dp in the second direction. In other words, the aperture 24 has a shape achieved by shifting the opening 25b in the second direction by an amount equivalent to a width d of the subpixels in the second direction and shifting the opening 25c by an amount equivalent to twice the width d of the subpixels in the second direction. By having such a shape, the aperture 24 has a numerical aperture which decreases along the second direction, and in which the subpixels having the plurality of colors which can be seen through the aperture 24 have the same area. The shape of the apertures 24 will be described in detail later.

In the display device 1 according to the present embodiment, linear blending is implemented by the positions of the apertures 24 appearing to move relative to the two-dimensional optical modulation element 22 when the viewpoint position of the observer ob changes. The principle of linear blending in the display device 1 according to the present embodiment will be described next.

The following will assume that, as illustrated in FIG. 6, the aperture 24 having the shape described with reference to FIG. 5 is disposed spanning from a red subpixel Rb in a pixel below a pixel px0 constituted by a red subpixel R0, a green subpixel G0, and a blue subpixel B0, to a green subpixel Bu of a pixel above the pixel px0. As illustrated in FIG. 6, the aperture 24 is the average of the following, as seen through the aperture 24: the area of the red subpixels (the total of the areas of the red subpixel R0 and the red subpixel Rb in the state illustrated in FIG. 6), the green subpixel (the area of the green subpixel G0 in the state illustrated in FIG. 6), and the area of the blue subpixels (the blue subpixel B0 and the blue subpixel Bu in the state illustrated in FIG. 6) (red subpixel area:green subpixel area:blue subpixel area=1:1:1).

Figure 7A:
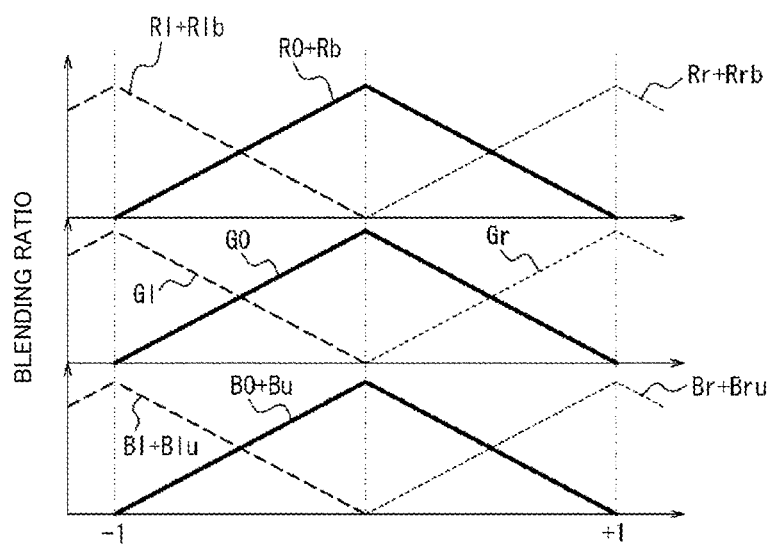
FIG. 7A is a figure illustrating changes in a blending ratio when the aperture appears to have moved in a first direction from the state illustrated in FIG. 6.

Assume that the aperture 24 appears to be shifted one pixel to the right (+1) or one pixel to the left (−1) from the state illustrated in FIG. 6. FIG. 7A illustrates a change in a blending ratio of the subpixels observed through the aperture 24 in this case.

As illustrated in FIG. 7A, it can be seen that for green, the blending ratio changes linearly in accordance with the change in the viewpoint position, and linear blending is therefore achieved.

For red, when the aperture 24 appears to be shifted by one pixel to the left, ⅓ of a red subpixel R1b in the pixel to the lower-left of the pixel px0 is mixed with a red subpixel R1 of the pixel to the left of the pixel px0, and in terms of the total of these subpixels, the blending ratio changes linearly. Additionally, when the aperture 24 appears to be shifted by one pixel to the right, ⅓ of a red subpixel Rrb in the pixel to the lower-right of the pixel px0 is mixed with a red subpixel Rr of the pixel to the right of the pixel px0, and in terms of the total of these subpixels, the blending ratio changes linearly. It can thus be seen that linear blending is achieved for red as well.

For blue, when the aperture 24 appears to be shifted by one pixel to the left, ⅓ of a blue subpixel Blu in the pixel to the upper-left of the pixel px0 is mixed with a blue subpixel B1 of the pixel to the left of the pixel px0, and in terms of the total of these subpixels, the blending ratio changes linearly. Additionally, when the aperture 24 appears to be shifted by one pixel to the right, ⅓ of a blue subpixel Bru in the pixel to the upper-right of the pixel px0 is mixed with a blue subpixel Br of the pixel to the right of the pixel px0, and in terms of the total of these subpixels, the blending ratio changes linearly. It can thus be seen that linear blending is achieved for blue as well.

As such, with the display device 1 according to the present embodiment, linear blending can be achieved for each of red, green, and blue when the viewpoint position moves in the first direction.

Figure 7B:
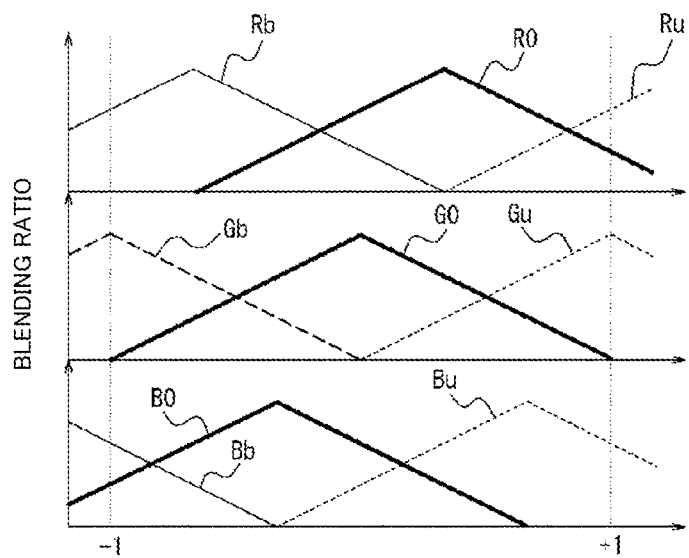
FIG. 7B is a figure illustrating changes in a blending ratio when the aperture appears to have moved in a second direction from the state illustrated in FIG. 6.

Next, assume that the aperture 24 appears to be shifted one pixel upward (+1) or one pixel downward (−1) from the state illustrated in FIG. 6. FIG. 7B illustrates a change in a blending ratio of the subpixels observed through the aperture 24 in this case.

As illustrated in FIG. 7B, it can be seen that even if the viewpoint position moves in the second direction, the blending ratio changes linearly in accordance with the change in the viewpoint position, even though the positions at which the blending ratio between subpixels of the same color in pixels vertically adjacent to each other is 100:0 will differ. As such, with the display device 1 according to the present embodiment, linear blending can be achieved for each of red, green, and blue when the viewpoint position moves in the second direction as well.

Thus according to the present embodiment, by observing an image through the apertures 24 having a shape in which the numerical aperture decreases along the second direction, the degree to which the adjacent pixels observed through the apertures 24 contribute can be changed smoothly when the viewpoint position has changed. As such, kinematic parallax can be reproduced and a high sense of realism can be expressed while using image display means having a typical stripe structure, rather than using image display means having a special pixel structure, and while suppressing an increase in the size of the device.

Figure 8:
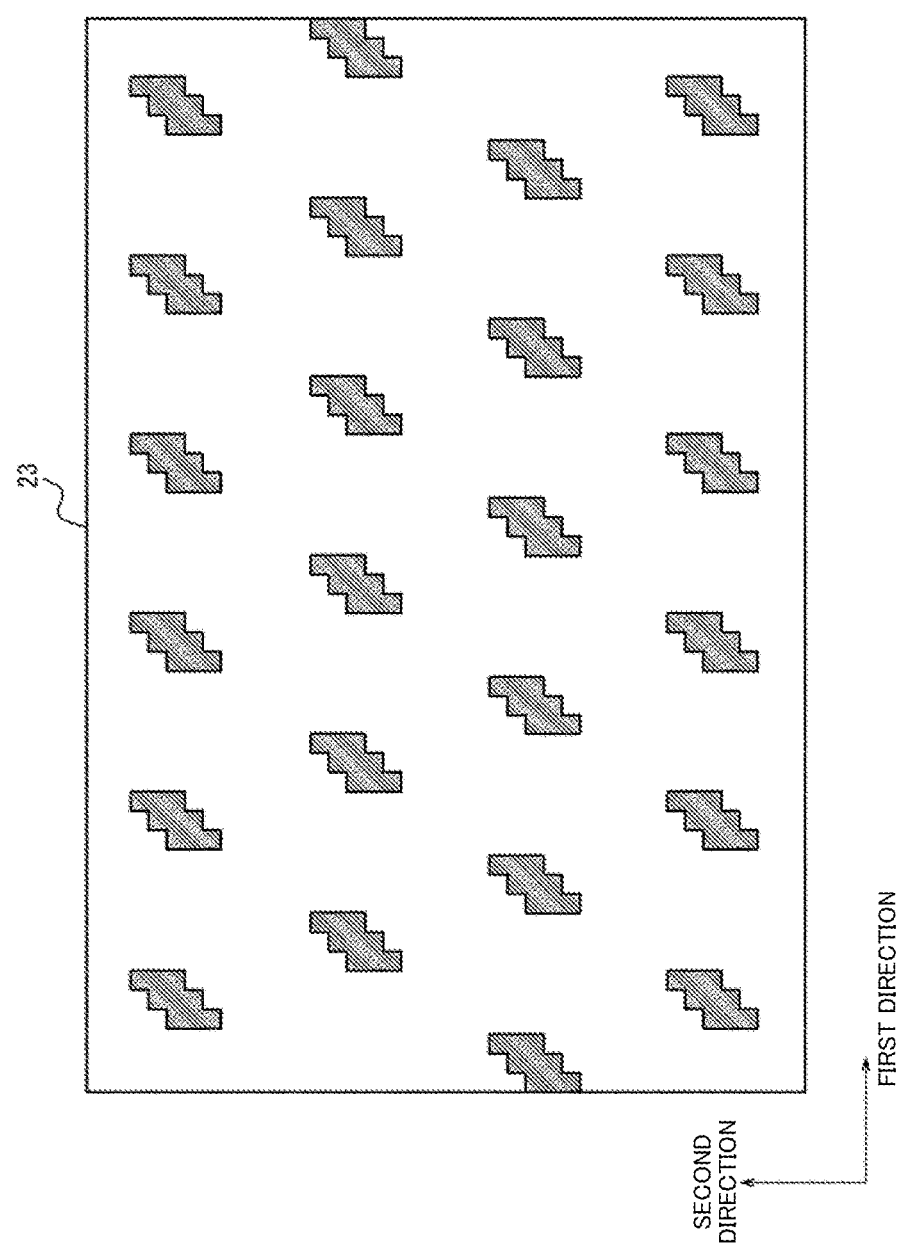
FIG. 8 is a figure illustrating another example of the configuration of the barrier illustrated in FIGS. 2A and 2B.

Although FIG. 4 illustrates a configuration of the barrier 23 in which the apertures 24 are disposed at the same intervals in both the first direction and the second direction (disposed in squares), the present invention is not limited to this configuration. As illustrated in FIG. 8, the apertures 24 may be skewed instead of being disposed in squares. In FIG. 8, the apertures 24 are disposed regularly in the first direction. Relative to the apertures 24 in the first row, the apertures 24 in the second row are shifted to the right by an amount equivalent to the width of the apertures 24 in the first direction. Furthermore, relative to the apertures 24 in the second row, the apertures 24 in the third row are shifted to the left by an amount equivalent to the width of the apertures 24 in the first direction.

Additionally, FIG. 4 illustrates the configuration of the barrier 23 using an example in which the apertures 24 are formed at intervals of three pixels in the first direction and the second direction, i.e., in which a single aperture 24 is provided with respect to a region constituted by 3×3, i.e., 9, pixels. With such an arrangement, a visual area having the same angle in the first direction and the second direction can be secured as long as the pixels are square pixels.

Here, if, for example, a single aperture 24 is provided for a region constituted by 18 pixels, i.e., six pixels in the first direction and three pixels in the second direction (6×3), the visual area in the first direction expands to twice that of a case where the region is 3×3. A human's viewpoint typically often moves in the horizontal direction (the first direction, in the present embodiment), and thus a display which efficiently uses pixels in accordance with a human's observation state can be performed. Additionally, the region in which the aperture 24 is disposed is not limited to a quadrangular region. For example, a single apertures 24 may be disposed for a hexagonal region. In this case, a single apertures 24 is disposed for a plurality of pixels enclosed within a prescribed hexagon. The apertures 24 are disposed in positions in each region so that the relative positions of the apertures 24 with respect to the corresponding regions are constant. Generally speaking, the viewpoint is set in front of the screen, and the apertures 24 are disposed so that using that viewpoint as a base point, lines of sight passing through the apertures 24 terminate at the centers of the regions.

Additionally, the shapes of the apertures 24 may vary as long as the areas of the apertures 24 are constant.

Furthermore, the regions corresponding to a single aperture 24 preferably do not overlap with each other. However, generally speaking, the openings are disposed densely to make effective use of the pixels. As such, the apertures 24 are often arranged at regular intervals, so as to match the regular arrangement of the regions. However, moirés can be suppressed, the apparent resolution can be improved, and so on by shifting the arrangement of the regions corresponding to the apertures 24 from a regular arrangement, shifting the positional relationships between the apertures 24 and the regions corresponding to those apertures 24 randomly by an amount no greater than a single pixel, and so on.

Figure 9A:
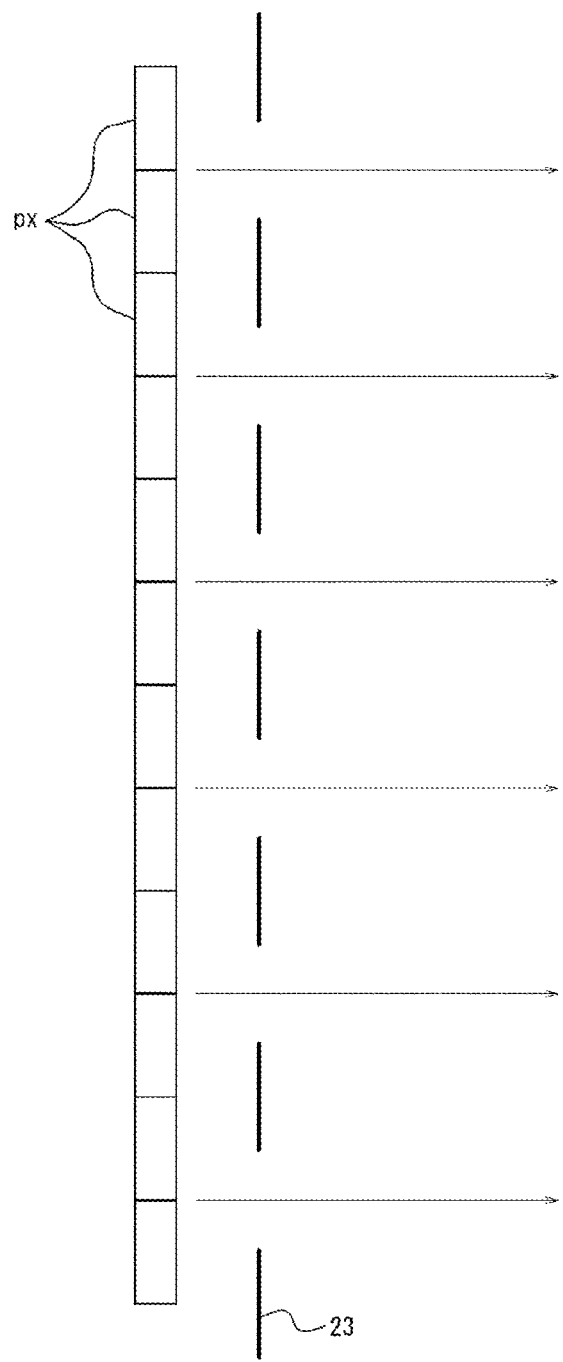
FIG. 9A is a figure illustrating the adjustment of a visual range by enlarging/reducing the barrier in the display device illustrated in FIG. 1.

With the display device 1 according to the present embodiment, assuming that the size of the apertures 24 is the same as the size of a single pixel and the intervals between the apertures 24 are the same as the intervals between pixels, the directions in which the blending ratio of adjacent pixels px observed through the apertures 24 are constant are parallel between different pixels, as illustrated in FIG. 9A. In this case, the blending ratio of the pixels px is constant when viewed from infinity. The device is therefore suited to observation from relatively long distances.

Figure 9B:
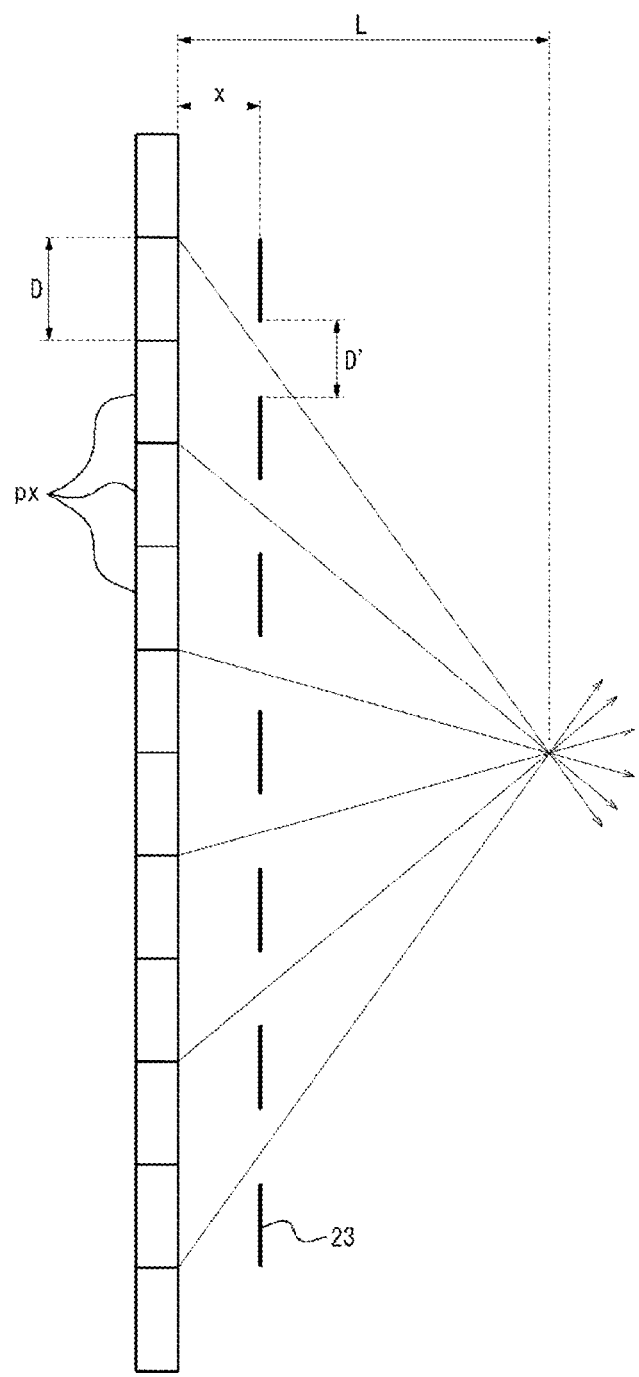
FIG. 9B is a figure illustrating the adjustment of the visual range by enlarging/reducing the barrier in the display device illustrated in FIG. 1.

On the other hand, if the barrier 23 is made smaller as a whole, the arrows indicating the directions in which the blending ratio is constant converge at a point that is closer to the screen, as illustrated in FIG. 9B. As such, the device is therefore suited to observation from closer distances. Note that when the image display unit 2 has the configuration illustrated in FIG. 2B, the same effect can be achieved by enlarging the barrier 23 as a whole.

When the barrier 23 as a whole is enlarged or reduced, the apertures 24 are also enlarged or reduced. Here, when D represents the width of the pixels px, D' represents the width of the apertures 24, x represents the distance between the pixels px and the barrier 23, and L represents an optimal visual range, a relationship between the width D of the pixels px and the width D' of the aperture 24 is expressed by the following Formula (1).

[Formula 1]

$$D' = \frac{L-x}{L}D \quad (1)$$

Here, the distance x between the pixels px and the barrier 23 is typically about several mm (e.g., about 2 mm). The optimal visual range L is about several m (e.g., about 1 m). Accordingly, there is an extremely small difference between the width D of the pixels px and the width D' of the apertures 24. As such, the width D' of the apertures 24 and the width D of the pixels px are substantially the same. As described above, each of the apertures 24 has an area equivalent to a positive integral multiple of one pixel. In the present specification, "having an area equivalent to a positive integral multiple of one pixel" not only means cases of having an area equivalent to a positive integral multiple of one pixel, but also includes cases where the barrier 23 has been reduced or enlarged in accordance with the distance x between the pixels px and the barrier 23 and the optimal visual range L, i.e., cases where the apertures 24 have been reduced or enlarged. As can be seen from FIGS. 9A and 9B, when the positional relationship between the pixels in the panel and the openings shifts, the direction of light beams with respect to the pixels deviates from the design conditions. Thus with respect to the positional relationship between the panel and the openings in the barrier, a mechanism is provided which makes it possible to adjust translational movement and in-plane rotation relatively, in two directions within a plane. At least for the screen as a whole, it is necessary to provide the ideal conditions, i.e., no greater than one pixel's worth of skew from a state in which the positional relationship is such that the regions constituted by pixels corresponding to the apertures 24 exactly match the openings, and it is desirable that this skew be less than 1/10 of one pixel. Accordingly, fine adjustments are made to the positional relationship between the panel and the openings in the barrier so that the pixel skew stays within this range. Note that because a micromovement mechanism will increase the cost of the device, it goes without saying that an image may be displayed at a viewpoint position shifted so as to compensate for such relative positional skew.

Figure 10A:
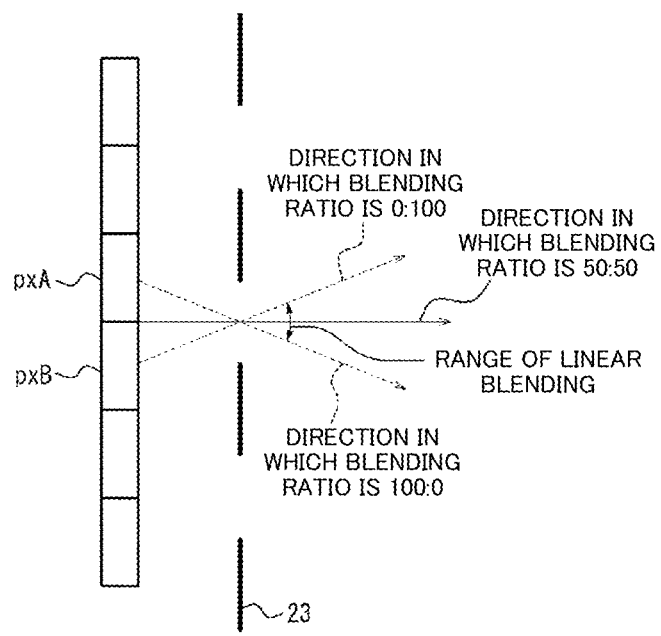
FIG. 10A is a figure illustrating a visual area in the display device illustrated in FIG. 1.

When the ratio of the width of the light-blocking part of the barrier 23 to the width of the apertures 24 is 1:1, the pixels observed through a single aperture 24 are two adjacent pixels px (a pixel pxA and a pixel pxB), as illustrated in FIG. 10A. These two pixels pxA and pxB contribute to the linear blending during observation through a single aperture 24.

In this case, a range between the direction in which only the pixel pxA is observed through the aperture 24 (the direction in which the blending ratio is 100:0) and the direction in which only the pixel pxB is observed through the aperture 24 (the direction in which the blending ratio is 0:100) is a range subjected to linear blending.

Figure 10B:
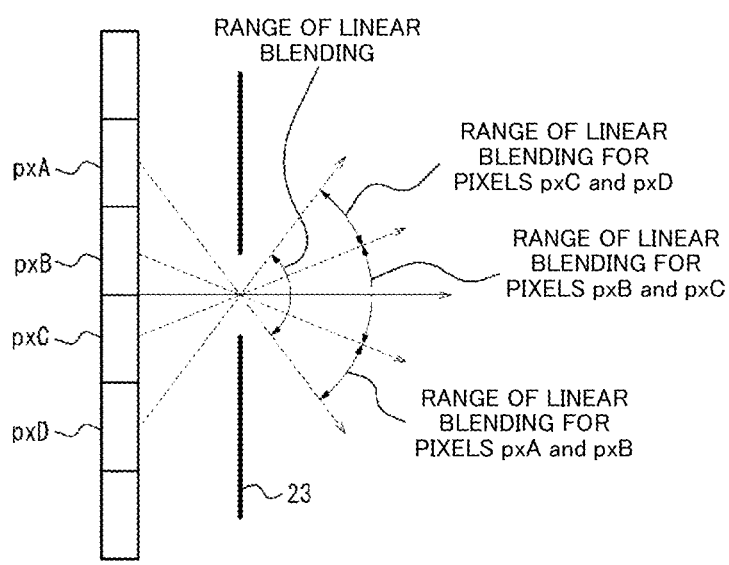
FIG. 10B is a figure illustrating the visual area in the display device illustrated in FIG. 1.

If the percentage occupied by the light-blocking part is increased while maintaining the same width for the aperture 24, the number of pixels contributing to the linear blending will increase. FIG. 10B illustrates an example in which four pixels (the pixel pxA, the pixel pxB, a pixel pxC, and a pixel pxD) contribute to the linear blending.

In FIG. 10B, a range obtained by combining the range of linear blending of the pixels pxA and pxB, the range of linear blending of the pixels pxB and pxC, and the range of linear blending of the pixels pxC and pxD is the range of the linear blending. Accordingly, with the configuration illustrated in FIG. 10B, the visual area where linear blending will be applied can be enlarged compared to the configuration illustrated in FIG. 10A.

Although FIGS. 9A and 9B and FIGS. 10A and 10b illustrate a cross-section from one direction, the above-described visual range and visual area properties are the same in both the first direction and the second direction.

A display method used in the display device 1 according to the present embodiment will be described next.

Figures 11, 12:
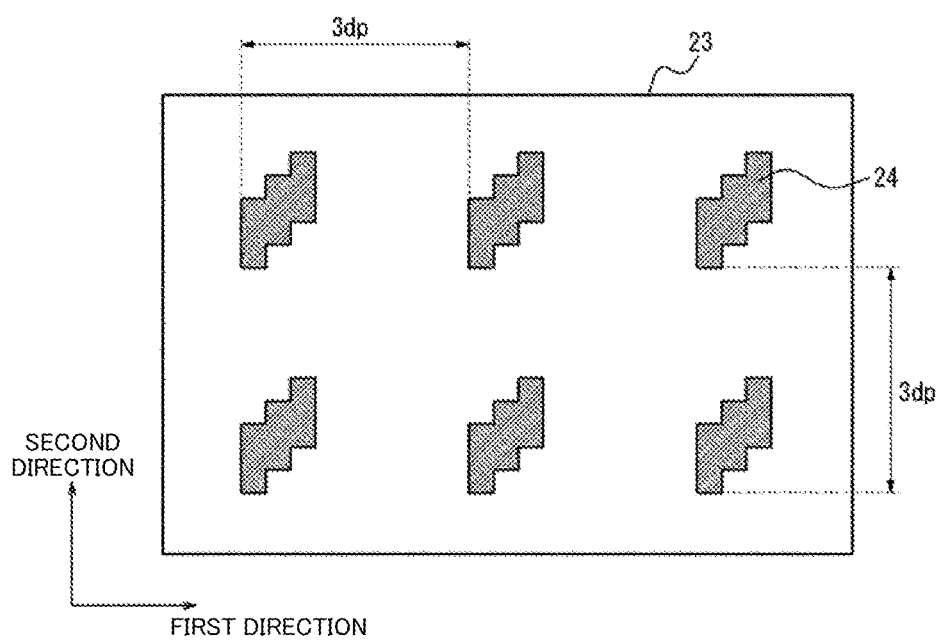
FIG. 11 is a figure illustrating a display method used with the display device illustrated in FIG. 1, and is a figure illustrating a pixel arrangement in the image display unit.
FIG. 12 is a figure illustrating the display method used with the display device illustrated in FIG. 1, and is a figure illustrating the configuration of the barrier.

FIG. 11 is a figure illustrating an example of the pixel configuration of the image display unit 2. In FIG. 11, each square represents a single pixel. As illustrated in FIG. 11, nine pixels, i.e., pixels 00, 10, 20, 01, 11, 21, 02, 12, and 22, are disposed in a 3×3 arrangement, and this arrangement is repeated in the first direction and the second direction. FIG. 12 is a figure illustrating an example of the configuration of the barrier 23.

The control unit 3 displays, in the image display unit 2, an image in which a subject is viewed from different directions, i.e., an image from different viewpoints (called a "directional image" hereinafter). Specifically, the control unit 3 distributes the pixels of an image taken from one viewpoint to pixels having the same number, and displays the resulting image.

The display image displayed in the display device 1 is an image shot by, for example, nine cameras arranged with optical axes parallel and in a 3×3 square shape. Additionally, when, for example, a single aperture 24 is disposed for a 2×2 region constituted by two pixels in the first direction and two pixels in the second direction, the display image is an image shot by four cameras arranged so that the optical axes are parallel and the cameras are located at the four corners of a square. When the pixel arrangements are different in regions corresponding to a single aperture 24, the display image is an image shot by taking the same number of cameras as there are pixels in a single region and arranging those cameras with the same arrangement as the pixels. Note that a plurality of cameras may be arranged facing inward so that the optical axes of the cameras face a specific convergence point, and an image obtained by subjecting the shot images to trapezoidal distortion correction may be used as the display image.

The control unit 3 displays the pixels of an image from a prescribed viewpoint in pixels observed through the apertures 24 from the viewpoint. For example, in the configuration illustrated in FIG. 2A, when the display device 1 is viewed from the lower-right, the control unit 3 displays the pixels from the image shot by the camera on the lower-right in the pixels 00 observed through the apertures 24. Specifically, the control unit 3 displays the pixels from the image shot by the camera on the lower-right in the pixels 00 corresponding to the positions of the stated pixels. Additionally, the control unit 3 displays the pixels from the image shot by the camera on the lower-left in the pixels 20, the pixels from the image shot by the camera on the upper-right in the pixels 02, the pixels from the image shot by the camera on the upper-left in the pixels 22, and the pixels from the image shot by the camera in the center in the pixels 11.

Meanwhile, in the configuration illustrated in FIG. 2B, when the display device 1 is viewed from the upper-left, the control unit 3 displays the pixels from the image shot by the camera on the upper-left in the pixels 00 observed through the apertures 24. Additionally, the control unit 3 displays the pixels from the image shot by the camera on the upper-right in the pixels 20, the pixels from the image shot by the camera on the lower-left in the pixels 02, the pixels from the image shot by the camera on the lower-right in the pixels 22, and the pixels from the image shot by the camera in the center in the pixels 11.

Taking the pixels observed when viewing through the apertures 24 from a prescribed viewpoint and displaying the pixels of an image from that viewpoint on the stated pixels realizes linear blending with respect to viewpoint movement in the first direction and the second direction, and an image from an intermediate viewpoint is observed. This is clear from the descriptions given with reference to FIGS. 7A and 7B.

The control unit 3 displays an image in which the parallax of an image displayed in an adjacent pixel is less than or equal to ten minutes, and preferably less than or equal to five minutes. The "parallax of an image" is an amount in which a skew δ between images from viewpoints adjacent on the screen is expressed as an angle when viewing from an assumed visual range L, and is expressed as follows.

[Formula 2]

$$2\tan\frac{\delta}{2L}$$

Note that with a typical shot image, the parallax differs greatly depending on the distance. As such, when shooting an image for display, the shooting is carried out in front of a solid background so that no regions with a high amount of parallax arise. Additionally, in the present embodiment, the images are moved parallel and displayed to minimize parallax of the subject. This makes it possible to improve the quality of the observed image. In other words, the quality of the observed image can be improved by adjusting the convergence. It is clear that the same effect can be achieved even when using a lens with a shallow depth of field to blur the background aside from the subject.

Figure 13:
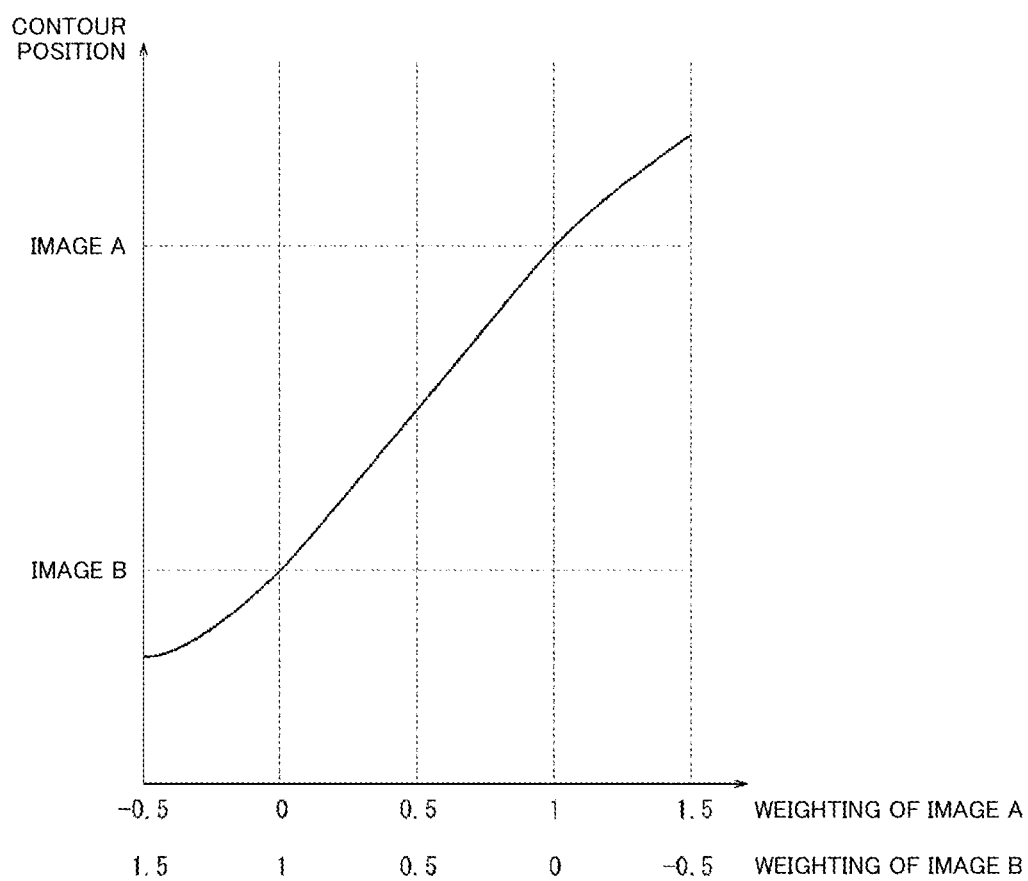
FIG. 13 is a figure illustrating a relationship between a weighted average and contour positions of two images.

FIG. 13 is a figure illustrating a relationship between a weighted average and contour positions of two images (an image A and an image B). When a directional image is displayed in order to ensure the span of skew between two images at adjacent viewpoints is a low value of approximately 3 (arc min), images of appropriate contour positions according to the viewpoint positions are generated. This is because, as illustrated in FIG. 13, the contour positions change linearly and continuously between weighting ratios of 0 to 1. In other words, an image which is faithful to the intermediate viewpoint is perceived by connecting two images having a low level of image skew at a ratio which changes linearly. Note that when the image has few high-frequency components in its spatial frequency, an image at the intermediate viewpoint is perceived even when the span of the skew is approximately 10 (arc min).

The shape of the apertures 24 will be described in detail hereinafter. As described above, each of the apertures 24 has an area equivalent to a positive integral multiple of the area of one pixel. More specifically, the aperture 24 has the same area as a block constituted by a pixels (where a is an integer greater than or equal to 1) in the first direction and b pixels (where b is an integer greater than or equal to 1) in the second direction (a×b pixels). The following descriptions will assume that the aperture 24 has an area equal to that of a block in which 1×b pixels are arranged, i.e., in which b pixels are arranged in a single row in the second direction. Additionally, the phrase "having an area equivalent to a positive integral multiple of a single pixel" used above does not only include a case of having an area equivalent to a positive integral multiple of a single pixel. "Having an area equivalent to a positive integral multiple of one pixel" also includes cases where the barrier 23 has been reduced or enlarged in accordance with the distance x between the pixels px and the barrier 23 and the optimal visual range L, i.e., where the apertures 24 have been reduced or enlarged. Furthermore, "having an area equivalent to a positive integral multiple of one pixel" includes cases where the sizes of the apertures are maintained but the intervals between the apertures are increased or reduced at a prescribed rate in at least one of the first direction and the second direction, cases where the sizes of the openings are enlarged or reduced while maintaining the intervals between the openings to a degree assumed on the basis of the relationship between x and L, and a combination of these cases. Thus the dimensions of the parts described below can be increased or reduced as appropriate in accordance with the area required for the apertures 24.

Figure 14A:
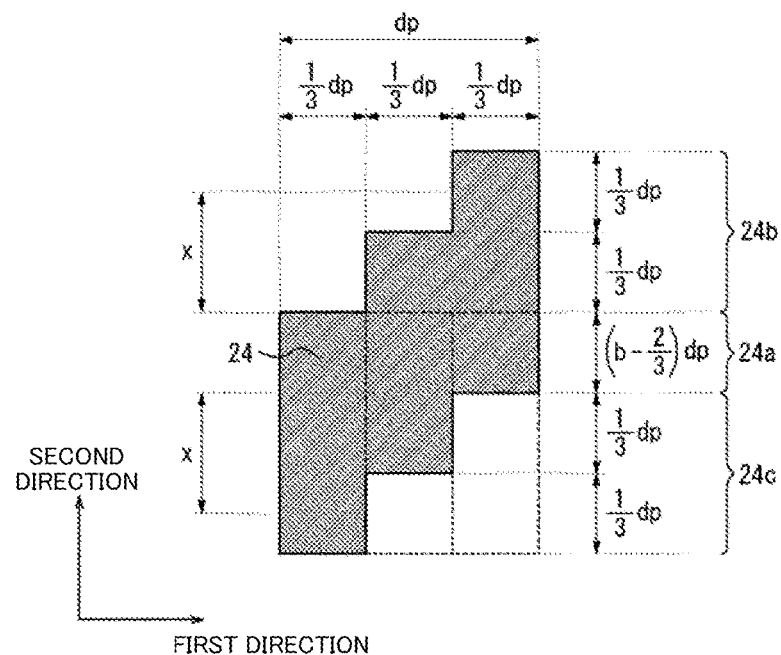
FIG. 14A is a figure illustrating an example of the shape of the apertures in the barrier illustrated in FIGS. 2A and 2B.

FIG. 14A is a figure illustrating an example of the shape of the aperture 24.

The aperture 24 illustrated in FIG. 14A has a shape in which an opening having the same shape as a block constituted by 1×b pixels is divided into three parts along the second direction, with the second region being shifted by (⅓)dp in the second direction and the third region being shifted by (⅔)dp in the second direction, in that order with respect to the first direction. The aperture 24 illustrated in FIG. 14A satisfies the following conditions.

First, as illustrated in FIG. 14A, the aperture 24 is constituted by a center part 24a having a width in the first direction that is equal to the width of the block, a first edge part 24b having a smaller width in the first direction than the center part 24a, and a second edge part 24c having a smaller width in the first direction than the center part 24a; a condition of having a shape in which the first edge part 24b, the center part 24a, and the second edge part 24c are arranged in that order with respect to the second direction (a condition A) is satisfied.

Additionally, as illustrated in FIG. 14A, the aperture 24 satisfies a condition of the width of the center part 24a in the second direction being a value obtained by subtracting a width x of the subpixel of one color in the second direction (the number of colors of subpixels−1) from a width bdp of the block in the second direction (a condition B). In the present embodiment, the number of colors of the subpixels is 3, and thus the width of a subpixel in the second direction is (⅓)dp. The width of the center part 24a in the second direction is therefore (b−⅔)dp.

Additionally, as illustrated in FIG. 14A, the aperture 24 satisfies a condition of the total width of the first edge part 24b in the first direction, at the position of the distance x in the second direction from a tangent line between the center part 24a and the first edge part 24b, being equal to the total width of the first edge part 24b in the first direction, at the position of the distance x in the second direction from a tangent line between the center part 24a and the second edge part 24c (a condition C).

Furthermore, as illustrated in FIG. 14A, the aperture 24 satisfies a condition of the total width of the first edge part 24b in the first direction and the total width of the second edge part 24c in the first direction at a given position in the second direction each being equivalent to (a width dp of the block in the first direction)×(1/number of colors of subpixels)×(a positive integer from 1 to (the number of colors of subpixels−1)) (a condition D). In the present embodiment, the number of colors of the subpixels is 3. Accordingly, the total width of the first edge part 24b in the first direction is an integral multiple of the width dp of the block in the first direction×(⅓)×{1 to (3−1)}. In other words, the total width of the first edge part 24b in the first direction at a given position in the second direction is (⅓)dp or (⅔)dp. The same applies to the second edge part 24c. Note that the region where the total width in the first direction is (⅓)dp is a region corresponding to the first subpixel from one end (an upper end) of the aperture 24 in the second direction. Additionally, the region where the total width in the second direction is (⅔)dp is a region corresponding to the second subpixel from one end (an upper end) of the aperture 24 in the second direction.

Additionally, as illustrated in FIG. 14A, the aperture 24 satisfies a condition of the total of the width of the first edge part 24b in the second direction and the width of the second edge part 24c in the second direction is constant in all cross-sections of the aperture 24 taken along the second direction, i.e., the total of the width of the first edge part 24b in the second direction and the width of the second edge part 24c in the second direction at given positions in the first direction is constant (a condition E).

Additionally, as illustrated in FIG. 14A, the aperture 24 satisfies a condition of having two points of rotational symmetry (a condition F).

Figure 14B:
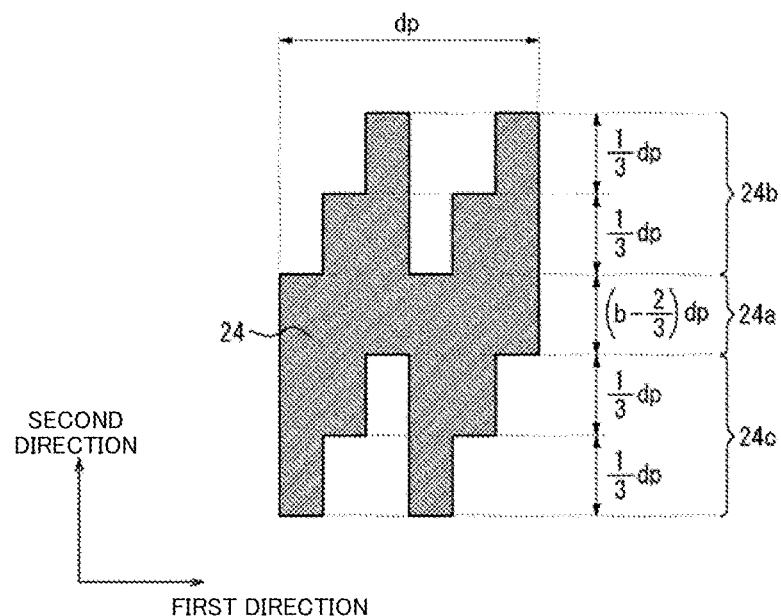
FIG. 14B is a figure illustrating another example of the shape of the apertures in the barrier illustrated in FIGS. 2A and 2B.

Note that the aperture 24 is not limited to the shape illustrated in FIG. 14A. FIG. 14B is a figure illustrating another example of the shape of the aperture 24.

The aperture 24 illustrated in FIG. 14B has a shape in which an opening having the same shape as a block constituted by 1×b pixels is divided into six parts along the second direction, with the second and fourth regions being shifted by (⅓)dp in the second direction and the third and sixth regions being shifted by (⅔)dp in the second direction, in that order with respect to the first direction.

The aperture 24 illustrated in FIG. 14B includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14B satisfies the above-described condition A. The aperture 24 illustrated in FIG. 14B also satisfies the condition B of the width of the center part 24a in the second direction being (b−⅔)dp. The aperture 24 illustrated in FIG. 14B furthermore satisfies the above-described condition C and condition D. Furthermore, because the total of the width of the first edge part 24b in the second direction and the width of the second edge part 24c in the second direction is always constant, the aperture 24 illustrated in FIG. 14B satisfies the above-described condition E. The aperture 24 illustrated in FIG. 14B furthermore satisfies the above-described condition F.

Figure 14C:
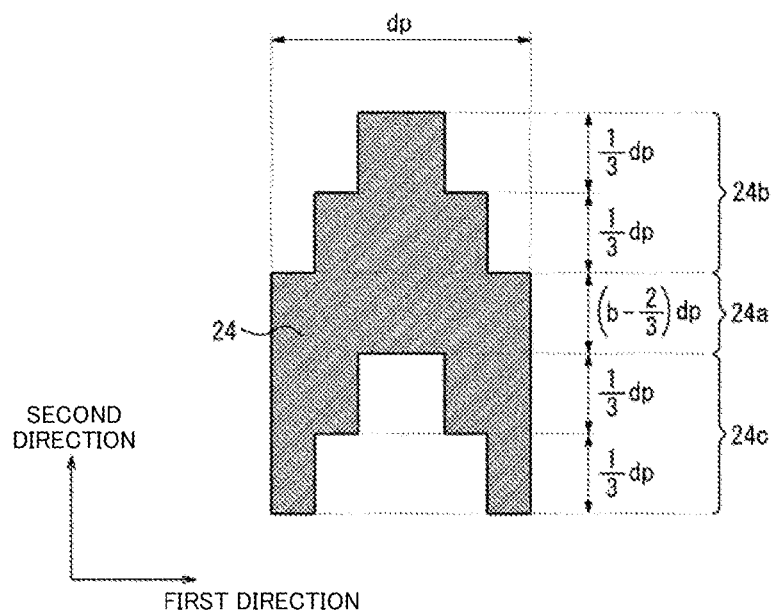
FIG. 14C is a figure illustrating yet another example of the shape of the apertures in the barrier illustrated in FIGS. 2A and 2B.

FIG. 14C is a figure illustrating yet another example of the shape of the aperture 24.

The aperture 24 illustrated in FIG. 14C has a shape in which an opening having the same shape as a block constituted by 1×b pixels is divided into six parts along the second direction, with the second and fifth regions being shifted by (⅓)dp in the second direction and the third and fourth regions being shifted by (⅔)dp in the second direction, in that order with respect to the first direction.

The aperture 24 illustrated in FIG. 14C includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14C satisfies the above-described condition A. The aperture 24 illustrated in FIG. 14C also satisfies the condition B of the width of the center part 24a in the second direction being (b−⅔)dp. The aperture 24 illustrated in FIG. 14C furthermore satisfies the above-described condition C and condition D. Furthermore, because the total of the width of the first edge part 24b in the second direction and the width of the second edge part 24c in the second direction is always constant, the aperture 24 illustrated in FIG. 14C satisfies the above-described condition E.

Figure 14D:
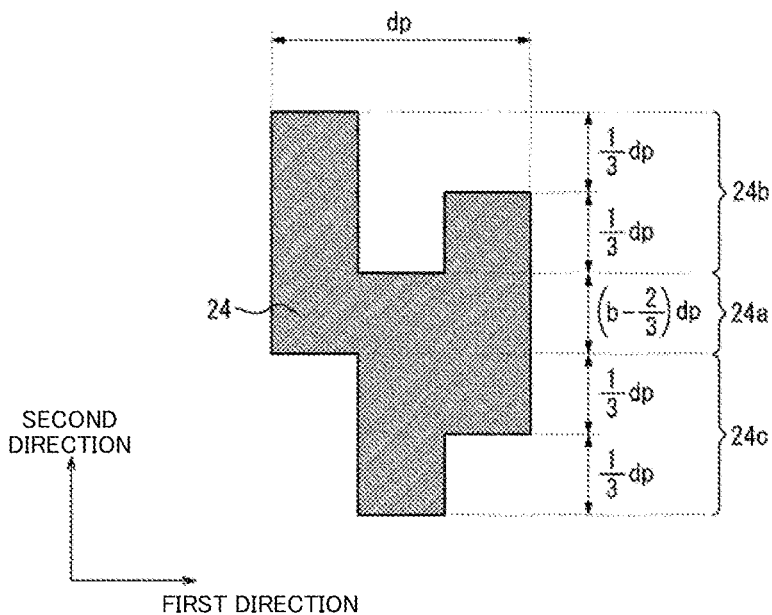
FIG. 14D is a figure illustrating yet another example of the shape of the apertures in the barrier illustrated in FIGS. 2A and 2B.

FIG. 14D is a figure illustrating yet another example of the shape of the aperture 24.

The aperture 24 illustrated in FIG. 14D has a shape in which an opening having the same shape as a block constituted by 1×b pixels is divided into three parts along the second direction, with the first region being shifted by (⅔)dp in the second direction and the third region being shifted by (⅓)dp in the second direction, in that order with respect to the first direction.

The aperture 24 illustrated in FIG. 14D includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14D satisfies the above-described condition A. The aperture 24 illustrated in FIG. 14D also satisfies the condition B of the width of the center part 24a in the second direction being (b−⅔)dp. The aperture 24 illustrated in FIG. 14D furthermore satisfies the above-described condition C and condition D. Furthermore, because the total of the width of the first edge part 24b in the second direction and the width of the second edge part 24c in the second direction is always constant, the aperture 24 illustrated in FIG. 14D satisfies the above-described condition E.

Figure 14E:
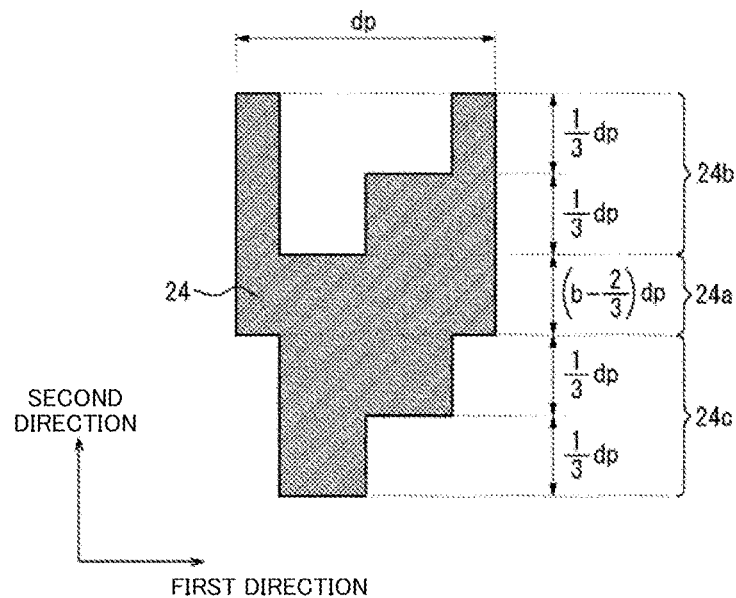
FIG. 14E is a figure illustrating yet another example of the shape of the apertures in the barrier illustrated in FIGS. 2A and 2B.

FIG. 14E is a figure illustrating yet another example of the shape of the aperture 24.

The aperture 24 illustrated in FIG. 14E has a shape in which an opening having the same shape as a block constituted by 1×b pixels is divided into six parts along the second direction, with the first and sixth regions being shifted by (⅔)dp in the second direction and the fourth and fifth regions being shifted by (⅓)dp in the second direction, in that order with respect to the first direction.

The aperture 24 illustrated in FIG. 14E includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14E satisfies the above-described condition A. The aperture 24 illustrated in FIG. 14E also satisfies the condition B of the width of the center part 24a in the second direction being (b−⅔)dp. The aperture 24 illustrated in FIG. 14E furthermore satisfies the above-described condition C and condition D. Furthermore, because the total of the width of the first edge part 24b in the second direction and the width of the second edge part 24c in the second direction is always constant, the aperture 24 illustrated in FIG. 14E satisfies the above-described condition E.

Figure 14F:
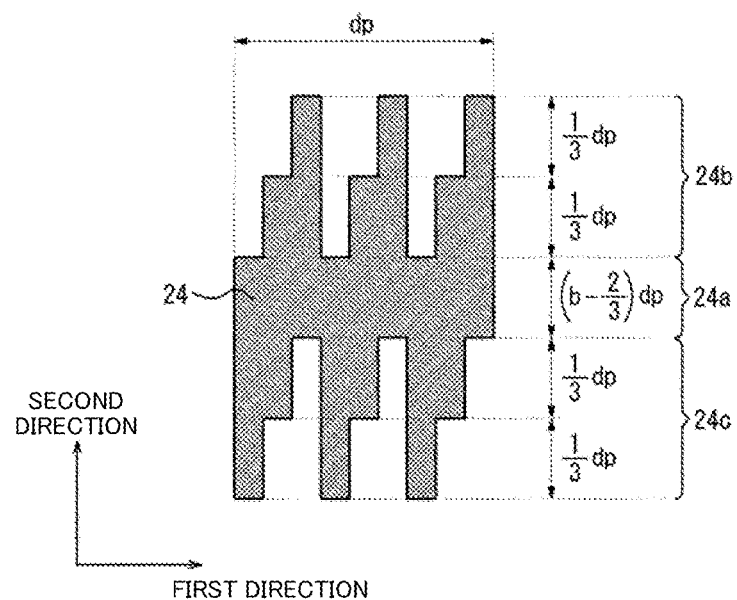
FIG. 14F is a figure illustrating yet another example of the shape of the apertures in the barrier illustrated in FIGS. 2A and 2B.

FIG. 14F is a figure illustrating yet another example of the shape of the aperture 24.

The aperture 24 illustrated in FIG. 14F has a shape in which an opening having the same shape as a block constituted by 1×b pixels is divided into nine parts along the second direction, with the second, fifth, and eighth regions being shifted by (⅓)dp in the second direction and the third, sixth, and ninth regions being shifted by (⅔)dp in the second direction, in that order with respect to the first direction.

The aperture 24 illustrated in FIG. 14F includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14F satisfies the above-described condition A. The aperture 24 illustrated in FIG. 14F also satisfies the condition B of the width of the center part 24a in the second direction being (b−⅔)dp. The aperture 24 illustrated in FIG. 14F furthermore satisfies the above-described condition C and condition D. Furthermore, because the total of the width of the first edge part 24b in the second direction and the width of the second edge part 24c in the second direction is always constant, the aperture 24 illustrated in FIG. 14F satisfies the above-described condition E. The aperture 24 illustrated in FIG. 14F furthermore satisfies the above-described condition F.

Figure 14G:
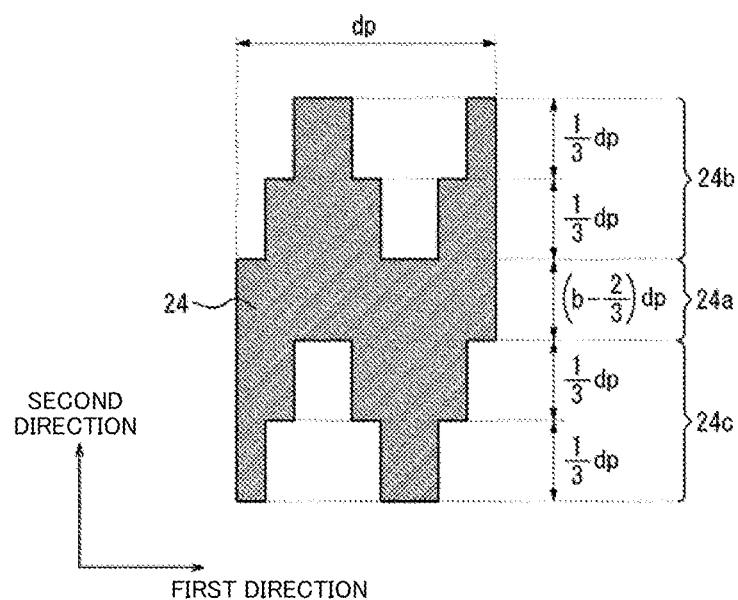
FIG. 14G is a figure illustrating yet another example of the shape of the apertures in the barrier illustrated in FIGS. 2A and 2B.

FIG. 14G is a figure illustrating yet another example of the shape of the aperture 24.

The aperture 24 illustrated in FIG. 14G has a shape in which an opening having the same shape as a block constituted by 1×b pixels is divided into nine parts along the second direction, with the second, fifth, and eighth regions being shifted by (⅓)dp in the second direction and the third, fourth, and ninth regions being shifted by (⅔)dp in the second direction, in that order with respect to the first direction.

The aperture 24 illustrated in FIG. 14G includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14G satisfies the above-described condition A. The aperture 24 illustrated in FIG. 14G also satisfies the condition B of the width of the center part 24a in the second direction being (b−⅔)dp. The aperture 24 illustrated in FIG. 14G furthermore satisfies the above-described condition C and condition D. Furthermore, because the total of the width of the first edge part 24b in the second direction and the width of the second edge part 24c in the second direction is always constant, the aperture 24 illustrated in FIG. 14G satisfies the above-described condition E. The aperture 24 illustrated in FIG. 14G furthermore satisfies the above-described condition F.

The same effects as those provided by the aperture 24 illustrated in FIG. 14A can be achieved by the apertures 24 illustrated in FIGS. 14B to 14G.

Figure 14H:
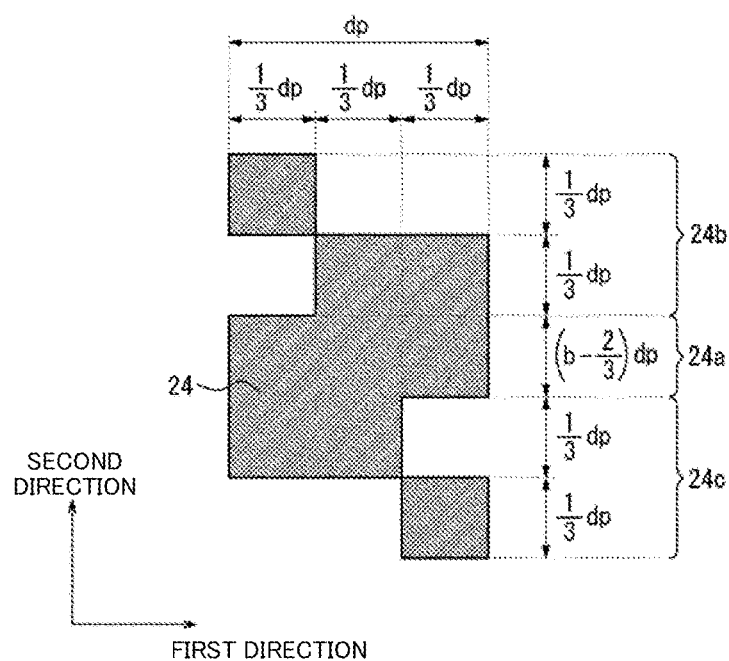
FIG. 14H is a figure illustrating yet another example of the shape of the apertures in the barrier illustrated in FIGS. 2A and 2B.

FIG. 14H is a figure illustrating yet another example of the shape of the aperture 24.

The aperture 24 illustrated in FIG. 14H has a shape in which, of an opening having the same shape as a block constituted by 1×b pixels, an upper-left region having a width of (⅓)dp in the first direction and (⅓)dp in the second direction is shifted by (⅓)dp in the second direction, and a lower-right region having a width of (⅓)dp in the first direction and (⅓)dp in the second direction is shifted by −(⅓)dp in the second direction.

The aperture 24 illustrated in FIG. 14H includes the center part 24*a*, the first edge part 24*b*, and the second edge part 24*c*, with the first edge part 24*b*, the center part 24*a*, and the second edge part 24*c* arranged in that order in the second direction. Accordingly, the aperture 24 illustrated in FIG. 14H satisfies the above-described condition A. The aperture 24 illustrated in FIG. 14H also satisfies the condition B of the width of the center part 24*a* in the second direction being (b−⅔)dp. The aperture 24 illustrated in FIG. 14H furthermore satisfies the above-described condition C and condition D. Furthermore, because the total of the width of the first edge part 24*b* in the second direction and the width of the second edge part 24*c* in the second direction is always constant, the aperture 24 illustrated in FIG. 14H satisfies the above-described condition E. The aperture 24 illustrated in FIG. 14H furthermore satisfies the above-described condition F.

The same overall effects as those provided by the aperture 24 illustrated in FIG. 14A can be achieved by the aperture 24 illustrated in FIG. 14H.

Although the aperture 24 illustrated in FIG. 14H is divided into a plurality of openings, together, these plurality of openings have the same area as the block constituted by 1×b pixels. "Aperture 24" refers to a region constituted by one or more openings which together have the same area as the block. Thus even when the aperture 24 is divided into a plurality of openings as illustrated in FIG. 14H, the aperture 24 is disposed corresponding to a single region. One or more openings which together have the same area as the block can be thought of as a single aperture.

Figure 14I:
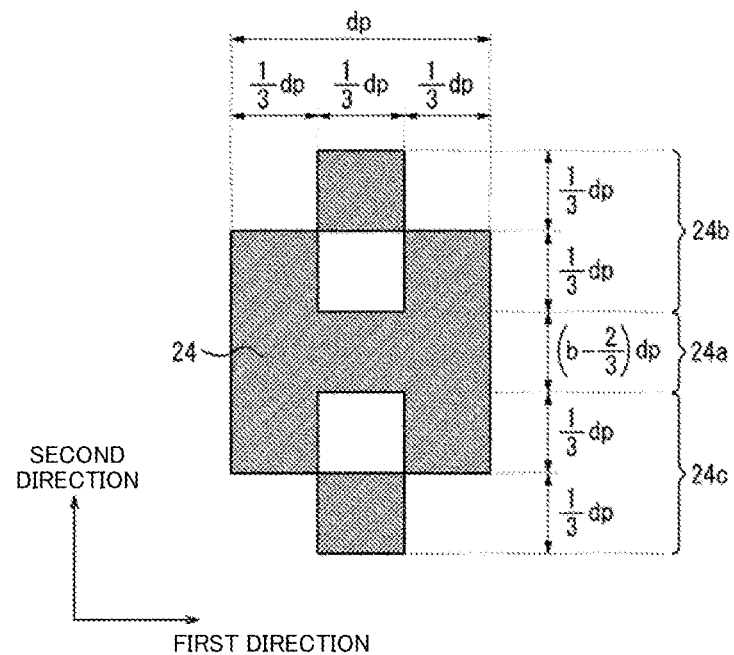
FIG. 14I is a figure illustrating yet another example of the shape of the apertures in the barrier illustrated in FIGS. 2A and 2B.

FIG. 14I is a figure illustrating yet another example of the shape of the aperture 24.

The aperture 24 illustrated in FIG. 14I has a shape in which an opening having the same shape as a block constituted by 1×b pixels is divided into three regions along the second direction, with a region having a width of (⅓)dp from one end (an upper end), in the second direction, of the middle region of the stated three regions being shifted by (⅓)dp in the second direction, and a region having a width of (⅓)dp from the other end (a lower end), in the second direction, of the middle region being shifted by −(⅓)dp in the second direction.

The aperture 24 illustrated in FIG. 14I includes the center part 24*a*, the first edge part 24*b*, and the second edge part 24*c*, with the first edge part 24*b*, the center part 24*a*, and the second edge part 24*c* arranged in that order in the second direction. Accordingly, the aperture 24 illustrated in FIG. 14I satisfies the above-described condition A. The aperture 24 illustrated in FIG. 14I also satisfies the condition B of the width of the center part 24*a* in the second direction being (b−⅔)dp. The aperture 24 illustrated in FIG. 14I furthermore satisfies the above-described condition C and condition D. Furthermore, because the total of the width of the first edge part 24*b* in the second direction and the width of the second edge part 24*c* in the second direction is always constant, the aperture 24 illustrated in FIG. 14I satisfies the above-described condition E. The aperture 24 illustrated in FIG. 14I furthermore satisfies the above-described condition F.

The same effects as those provided by the aperture 24 illustrated in FIG. 14A can be achieved by the aperture 24 illustrated in FIG. 14I. Additionally, the aperture 24 illustrated in FIG. 14I has a shape which has mirror-image symmetry (line symmetry) central to an axis extending in the second direction. By having such a shape, the aperture 24 illustrated in FIG. 14I enables a more natural image to be observed.

Figure 14J:
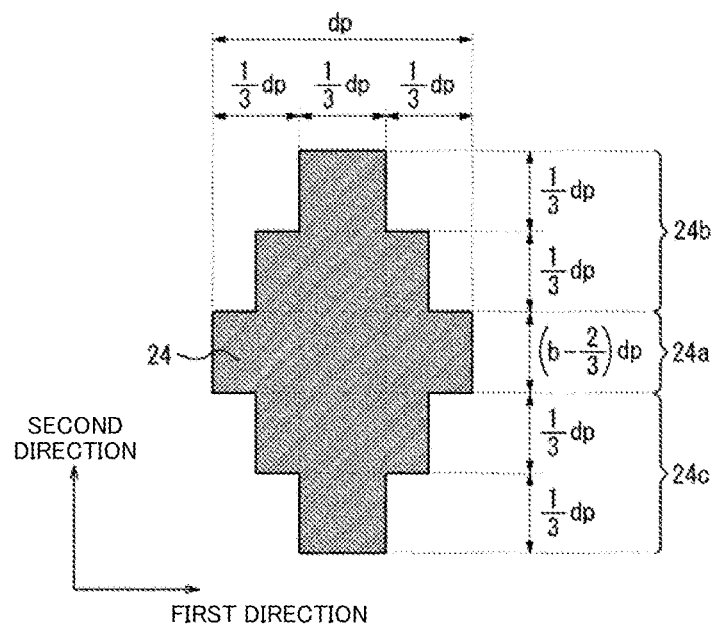
FIG. 14J is a figure illustrating yet another example of the shape of the apertures in the barrier illustrated in FIGS. 2A and 2B.

FIG. 14J is a figure illustrating yet another example of the shape of the aperture 24.

The aperture 24 illustrated in FIG. 14J has a center part 24*a* having a width in the first direction of dp and a width in the second direction of (b−⅔)dp. Additionally, the aperture 24 illustrated in FIG. 14J has a first edge part 24*b* constituted by an opening having a width of (⅔)dp in the first direction, a width of (⅓)dp in the second direction, and shifted by a prescribed value (e.g., (⅙)dp) from a left end of the center part 24*a*, and an opening having a width of (⅓)dp in the first direction, a width of (⅓)dp in the second direction, and shifted by a prescribed value (e.g., (⅓)dp) from the left end of the center part 24*a*. Furthermore, the aperture 24 illustrated in FIG. 14J has the second edge part 24*c*, which has the same shape as the first edge part 24*b*, on the side of the center part 24*a* opposite from the first edge part 24*b*.

The aperture 24 illustrated in FIG. 14J includes the center part 24*a*, the first edge part 24*b*, and the second edge part 24*c*, with the first edge part 24*b*, the center part 24*a*, and the second edge part 24*c* arranged in that order in the second direction. Accordingly, the aperture 24 illustrated in FIG. 14J satisfies the above-described condition A. The aperture 24 illustrated in FIG. 14J also satisfies the condition B of the width of the center part 24*a* in the second direction being (b−⅔)dp. The aperture 24 illustrated in FIG. 14J furthermore satisfies the above-described condition C and condition D. The aperture 24 illustrated in FIG. 14H furthermore satisfies the above-described condition F.

Figure 14K:
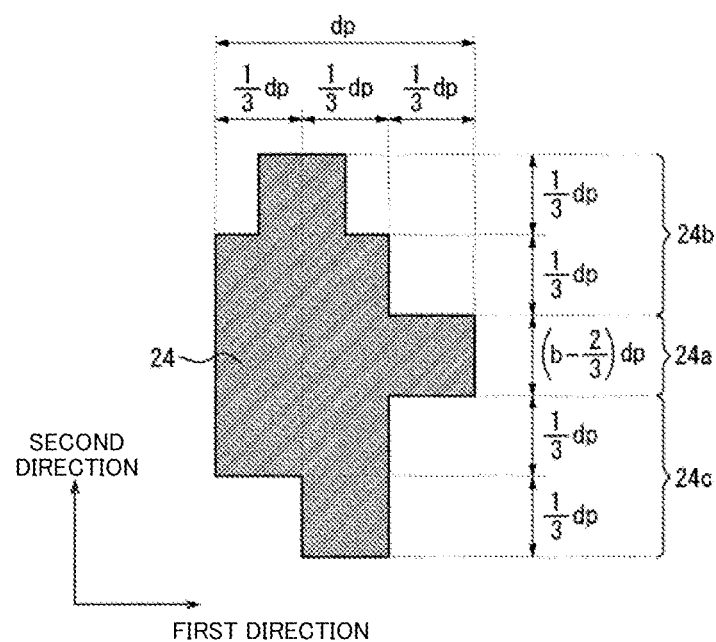
FIG. 14K is a figure illustrating yet another example of the shape of the apertures in the barrier illustrated in FIGS. 2A and 2B.

FIG. 14K is a figure illustrating yet another example of the shape of the aperture 24.

The aperture 24 illustrated in FIG. 14K has a center part 24*a* having a width in the first direction of dp and a width in the second direction of (b−⅔)dp. Additionally, the aperture 24 illustrated in FIG. 14K has a first edge part 24*b* constituted by an opening having a width of (⅔)dp in the first direction, a width of (⅓)dp in the second direction, and extending from the same position as a left end of the center part 24*a*, and an opening having a width of (⅓)dp in the first direction, a width of (⅓)dp in the second direction, and shifted by a prescribed value (e.g., (⅙)dp) from the left end of the center part. Additionally, the aperture 24 illustrated in FIG. 14K has a second edge part 24*c* constituted by an opening having a width of (⅔)dp in the first direction, a width of c in the second direction, and extending from the same position as a left end of the center part 24*a*, and an opening having a width of (⅓)dp in the first direction, a width of (⅓)dp in the second direction, and shifted by a prescribed value (e.g., (⅓)dp) from the left end of the center part.

The aperture 24 illustrated in FIG. 14K includes the center part 24*a*, the first edge part 24*b*, and the second edge part 24*c*, with the first edge part 24*b*, the center part 24*a*, and the second edge part 24*c* arranged in that order in the second direction. Accordingly, the aperture 24 illustrated in FIG. 14K satisfies the above-described condition A. The aperture 24 illustrated in FIG. 14K also satisfies the condition B of the width of the center part 24*a* in the second direction being (b−⅔)dp. The aperture 24 illustrated in FIG. 14K furthermore satisfies the above-described condition C and condition D.

With the apertures 24 illustrated in FIGS. 14J and 14K as well, the degree to which the adjacent pixels observed through the apertures 24 contribute can be changed smoothly when the viewpoint position has changed, which makes it possible to perform linear blending. However, with the apertures 24 illustrated in FIGS. 14J and 14K, it is conceivable that the image quality will drop in response to changes in the viewpoint position in the first direction, as compared to the aperture 24 illustrated in FIG. 14A.

Figure 14L:
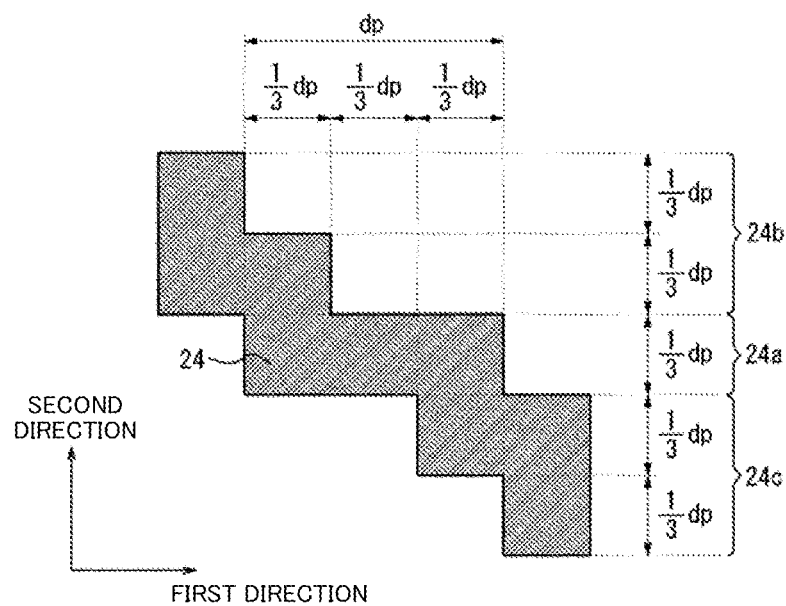
FIG. 14L is a figure illustrating yet another example of the shape of the apertures in the barrier illustrated in FIGS. 2A and 2B.

FIG. 14L is a figure illustrating yet another example of the shape of the aperture 24. Note that in FIG. 14L, it is assumed that the block is constituted by a single pixel. In other words, it is assumed that the aperture 24 has an area equivalent to that of a single pixel.

The aperture 24 illustrated in FIG. 14L has a center part 24a having a width in the first direction of dp and a width in the second direction of (b−⅔)dp (in FIG. 14L, b=1). Additionally, the aperture 24 illustrated in FIG. 14L has a first edge part 24b constituted by an opening having a width of (⅔)dp in the first direction, a width of (⅓)dp in the second direction, and extending in the first direction from a position shifted by (⅓)dp further to the left from the left end of the center part 24a, and an opening having a left end positioned at the same position as the left end of the other opening, having a width of (⅓)dp in the first direction, and having a width of (⅓)dp in the second direction. Additionally, the aperture 24 illustrated in FIG. 14L has a second edge part 24c constituted by an opening having a width of (⅔)dp in the first direction, a width of (⅓)dp in the second direction, and extending in the first direction from a position shifted by (⅓)dp further to the left from a right end of the center part 24a, and an opening having a right end positioned at the same position as the right end of the other opening, having a width of (⅓)dp in the first direction, and having a width of (⅓)dp in the second direction.

The aperture 24 illustrated in FIG. 14L includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14L satisfies the above-described condition A. The aperture 24 illustrated in FIG. 14L also satisfies the condition B of the width of the center part 24a in the second direction being (b−⅔)dp. The aperture 24 illustrated in FIG. 14L furthermore satisfies the above-described condition C and condition D. The aperture 24 illustrated in FIG. 14L furthermore satisfies the above-described condition F. However, with the aperture 24 illustrated in FIG. 14L, the width in the first direction exceeds the width dp of the block in the first direction.

Figure 14M:
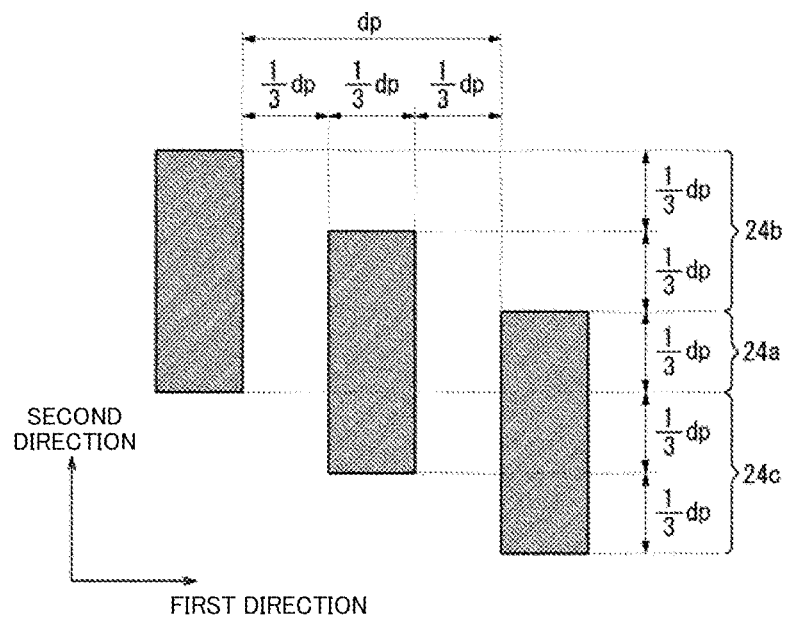
FIG. 14M is a figure illustrating yet another example of the shape of the apertures in the barrier illustrated in FIGS. 2A and 2B.

FIG. 14M is a figure illustrating yet another example of the shape of the aperture 24. Note that in FIG. 14M, it is assumed that the block is constituted by a single pixel. In other words, it is assumed that the aperture 24 has an area equivalent to that of a single pixel.

The aperture 24 illustrated in FIG. 14M has a shape in which three openings having a width of (⅓)dp in the first direction and a width of dp in the second direction are arranged at intervals equivalent to (⅓)dp in the first direction and shifted from each other by (⅓)dp in the second direction.

The aperture 24 illustrated in FIG. 14M includes the center part 24a, the first edge part 24b, and the second edge part 24c, with the first edge part 24b, the center part 24a, and the second edge part 24c arranged in that order in the second direction. Accordingly, the aperture 24 illustrated in FIG. 14M satisfies the above-described condition A. The aperture 24 illustrated in FIG. 14M also satisfies the condition B of the width of the center part 24a in the second direction being (b−⅔)dp (in FIG. 14M, b=1). The aperture 24 illustrated in FIG. 14M furthermore satisfies the above-described condition C and condition D. Furthermore, because the total of the width of the first edge part 24b in the second direction and the width of the second edge part 24c in the second direction is always constant, the aperture 24 illustrated in FIG. 14M satisfies the above-described condition E. The aperture 24 illustrated in FIG. 14M furthermore satisfies the above-described condition F.

With the apertures 24 illustrated in FIGS. 14L and 14M as well, the degree to which the adjacent pixels observed through the apertures 24 contribute can be changed smoothly when the viewpoint position has changed, which makes it possible to perform linear blending. However, with the apertures 24 illustrated in FIGS. 14L and 14M, it is conceivable that the image quality will drop significantly in response to changes in the viewpoint position in the first direction, as compared to the aperture 24 illustrated in FIG. 14A.

Figure 14N:
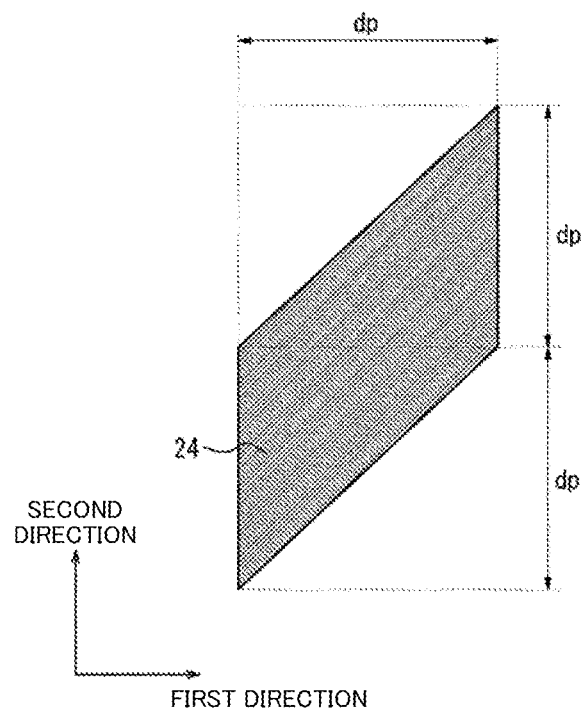
FIG. 14N is a figure illustrating yet another example of the shape of the apertures in the barrier illustrated in FIGS. 2A and 2B.

Note that the shape of the apertures 24 is not limited to stepped shapes such as those described with reference to FIGS. 14A to 14M. The shape of the apertures 24 may be a shape obtained by smoothing the shapes illustrated in FIGS. 14A to 14M. Here, "smoothing" refers to reducing the number of corners in the aperture 24. As such, the shape of the apertures 24 may be a shape in which, for example, the aperture 24 illustrated in FIG. 14A has been smoothed so as to reduce the number of corners, as illustrated in FIG. 14N (in FIG. 14N, the shape is a parallelogram). Smoothing the shape of the apertures 24 makes processing easier when forming the apertures 24. It goes without saying that the same effects can be achieved even with shapes in which there is some dimensional variance at the level of processing precision, the contours of the openings are jagged, the corners are rounded, and so on. The same applies to the conditions of rotational symmetry, and the same effects can be achieved as long as the symmetry matches substantially, even if the symmetry does not match perfectly.

Figure 15:
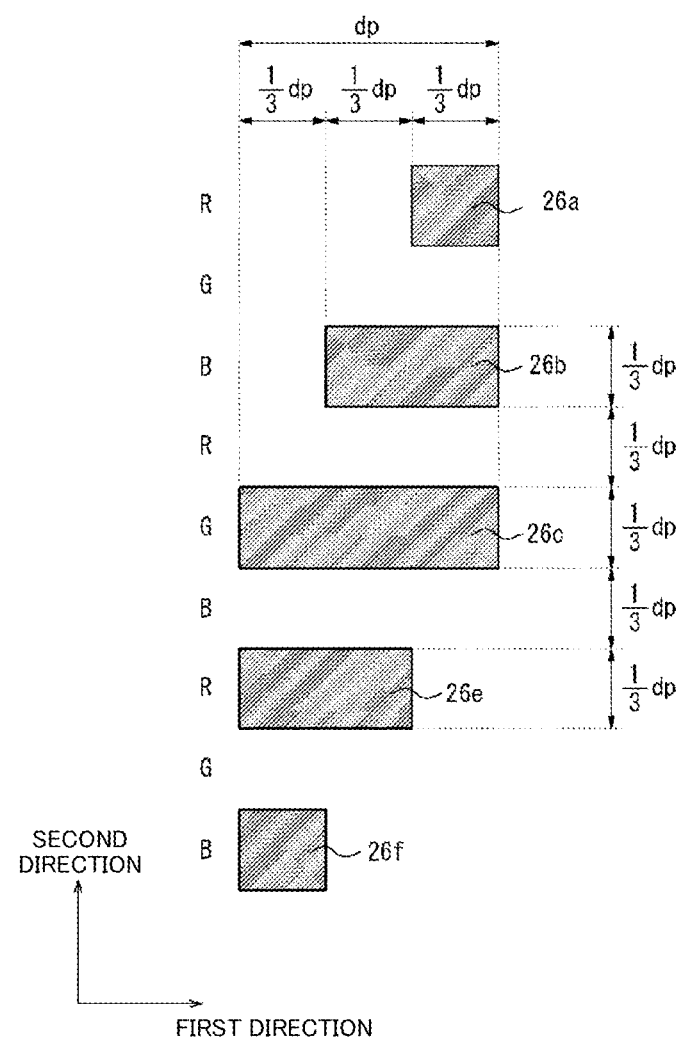
FIG. 15 is a figure illustrating an example of a shape not suitable for the apertures in the barrier illustrated in FIGS. 2A and 2B.

FIG. 15 is a figure illustrating an example of a shape not suitable for the apertures 24 in the barrier 23.

The aperture illustrated in FIG. 15 is constituted by openings 26a to 26e which are arranged at intervals of (⅓)dp in the second direction.

The opening 26a has a width of (⅓)dp in the first direction and a width of (⅓)dp in the second direction. The opening 26b has a width of (⅔)dp in the first direction, a width of (⅓)dp in the second direction, and extends in the first direction from a position shifted by (⅓)dp to the left from a left end of the opening 26a. The opening 26c has a width of dp in the first direction, a width of (⅓)dp in the second direction, and extends in the first direction from a position shifted by (⅓)dp to the left from a left end of the opening 26b. The opening 26d has a width of (⅔)dp in the first direction, a width of (⅓)dp in the second direction, and extends in the first direction from the same as a left end of the opening 26c. The opening 26e has a width of (⅓)dp in the first direction, a width of (⅓)dp in the second direction, and has a left end at the same position as the left end of the opening 26c.

As described above, the openings 26a to 26e are arranged at intervals equivalent to (⅓)dp in the second direction. Thus when looking through the opening 26a, the red subpixel of a given pixel is observed; when looking through the opening 26b, the blue subpixel of the same pixel is observed; when looking through the opening 26c, the green subpixel of a pixel adjacent below the given pixel is observed; when looking through the opening 26d, the red subpixel of a pixel adjacent one further pixel below is observed; and when looking through the opening 26e, the blue subpixel of the same pixel is observed.

With the aperture illustrated in FIG. 15, the openings are disposed separate from each other in the second direction, which means that information of adjacent images which are expected to be continuous (information of pixels blocked by the blight-blocking part aside from the openings) will be missing, and linear blending therefore cannot be performed.

Referring to FIGS. 14A to 14K, the aperture 24 has been described as having an area equivalent to that of a block constituted by 1×b pixels, and referring to FIGS. 14L and 14M, the aperture 24 has been described as having an area equivalent to a single pixel; however, the aperture 24 may have an area that is the same as that of a block constituted by a pixels in the first direction (where a is an integer greater than or equal to 1) and b pixels in the second direction (where b is an integer greater than or equal to 1). In this case, in FIGS. 14A to 14N, the width of the aperture 24 in the first direction may be changed from dp to a×dp. The following will describe the width of a block in the first direction as Dx and the width of a block in the second direction as Dy. Additionally, the following assumes that the number of subpixels constituting a single pixel, i.e., the number of colors of subpixels constituting a single pixel, is C.

When the aperture 24 has an area equivalent to that of a block constituted by a×b pixels, the width of the aperture 24 in the second direction is the same as the width Dx of the block in the first direction. Additionally, the aperture 24 has a shape in which a center part having a width, in the second direction, of Dy−(C−1)d, is provided, and a first edge part and a second edge part having widths in the second direction that are smaller than Dx are provided on either side of the center part in the second direction.

In consideration of the various shapes of the aperture 24 described with reference to FIGS. 14A to 14N, it is necessary for the shape of the aperture 24 to satisfy the following conditions.

First, it is necessary for the aperture 24 to satisfy a condition of the areas of the subpixels of each of the plurality of colors which can be seen through the aperture 24 being uniform. This condition is necessary in order to ensure the color balance of the image observed through the apertures 24.

It is also necessary for the aperture 24 to satisfy a condition of the numerical aperture decreasing along the second direction. This condition is based on condition A to condition D described above. When the aperture 24 has such a shape, the contributions of the adjacent pixels observed through the aperture 24 can be caused to change smoothly, which makes it possible to realize linear blending. Accordingly, kinematic parallax can be reproduced and a high sense of realism can be expressed without using image display means having a special pixel structure, and while suppressing an increase in the size of the device.

Additionally, it is preferable that the aperture 24 satisfy a condition of a total width of the aperture 24 in the first direction, at a position corresponding to an Nth subpixel (where N=1, 2, and so on up to C) from one end of the aperture 24 in the second direction and observed through the aperture 24, be a value obtained by dividing the product of the width of the block in the first direction and N by the number of colors of subpixels C. This condition is based on conditions C, D, and the like described above.

Additionally, it is preferable that the aperture 24 satisfy a condition of a total width of the aperture 24 in the second direction at a given position in the first direction be equivalent to the width of the block in the second direction. This condition is based on condition E and the like described above.

Additionally, it is preferable that the aperture 24 satisfy a condition in which a center of gravity of the aperture 24 matches the center of a quadrangle that circumscribes the aperture 24. This condition is based on condition F and the like described above. Note that while it is desirable that the center of gravity of the apertures 24 perfectly match the center of a quadrangle circumscribing the aperture 24, the same effect can be achieved even if, due to problems with processing precision or the like, the centers do not match perfectly but substantially match, as described earlier.

Additionally, as described above, the aperture 24 may have a shape that has been smoothed so as to reduce corners.

Although the present embodiment has been described using a configuration in which a single pixel is constituted by subpixels of three primary colors as an example, the configuration is not limited thereto. A single pixel may be constituted by subpixels of four primary colors, or subpixels having four colors such as red, green, blue, and white.

Additionally, a device which can change its transmittance depending on the location, such as a liquid crystal panel, may be used as the barrier 23. In this case, by switching the light-transmissive regions in a timed manner and switching the display image in synchronization therewith, an image can also be displayed in the light-blocking part of the barrier 23, which makes it possible to achieve a higher resolution.

The present invention is not limited to the configurations specified in the foregoing embodiments, and many variations are possible within a scope that does not depart from the essential spirit of the invention as set forth in the scope of patent claims. For example, the functions and so on of constituent elements or the like can be rearranged within a scope that is not logically inconsistent, or a plurality of constituent elements can be combined into one element, divided into more elements, or the like.

REFERENCE SIGNS LIST

1 Image display device
2 Image display unit
3 Control unit
21 Backlight
22 Two-dimensional optical modulation element
23 Barrier
24 Aperture
24a Center part
24b First edge part
24c Second edge part
25, 25a, 25b, 25c, 26a, 26b, 26c, 26d, 26e, 26f Opening
ob Observer
px Pixel

The invention claimed is:

1. A display device comprising: image display means having a stripe structure including subpixels of a plurality of colors disposed so that subpixels of the same color are arranged in a first direction, the image display means enabling an observer to observe, through an aperture, an image formed by pixels, each pixel being constituted by the subpixels of a plurality of colors, wherein the aperture has a shape in which areas of the subpixels of the plurality of colors which can be seen through the aperture are uniform, and in which a numerical aperture decreases along a second direction orthogonal to the first direction, and a plurality of the apertures are provided so as not to overlap with each other, wherein the aperture has the same area as a block constituted by a pixels (where a is an integer greater than or equal to 1) in the first direction and b pixels (where b is an integer greater than or equal to 1) in the second direction, and when a number of the colors of the subpixels is represented by C, a total width of the aperture in the first direction, at a position corresponding to an Nth subpixel (where N=1, 2, and so on up to C) from one end of the aperture in the second direction and observed through the aperture, is a value obtained by dividing a product of a width of the block in the first direction and N by C.

2. The display device according to claim 1, wherein a total width of the aperture in the second direction at a given position in the first direction matches or substantially matches the width of the block in the second direction.

3. The display device according to claim 2, wherein a center of gravity of the aperture matches or substantially matches a center of a quadrangle circumscribing the aperture.

4. The display device according to claim 1, wherein a center of gravity of the aperture matches or substantially matches a center of a quadrangle circumscribing the aperture.

5. The display device according to claim 1, wherein the aperture has a shape that has been smoothed so as to reduce a number of corners.

6. The display device according to claim 1, further comprising: a control unit that displays a pixel of an image from a prescribed viewpoint on a pixel observed when viewing through the aperture from the viewpoint.

7. The display device according to claim 6, wherein the control unit displays an image in which parallax of an image displayed in an adjacent pixel is less than or equal to ten minutes.

8. A display method for a display device including image display means, the image display means having a stripe structure including subpixels of a plurality of colors disposed so that subpixels of the same color are arranged in a first direction, and the image display means enabling an observer to observe, through an aperture, an image formed by pixels, each pixel being constituted by the subpixels of a plurality of colors, wherein the aperture has a shape in which areas of the subpixels of the plurality of colors which can be seen through the aperture are uniform, and in which a numerical aperture decreases along a second direction orthogonal to the first direction; a plurality of the apertures are provided so as not to overlap with each other; wherein the aperture has the same area as a block constituted by a pixels (where a is an integer greater than or equal to 1) in the first direction and b pixels (where b is an integer greater than or equal to 1) in the second direction, and when a number of the colors of the subpixels is represented by C, a total width of the aperture in the first direction, at a position corresponding to an Nth subpixel (where N=1, 2, and so on up to C) from one end of the aperture in the second direction and observed through the aperture, is a value obtained by dividing a product of a width of the block in the first direction and N by C and the method comprising: displaying a pixel of an image from a prescribed viewpoint on a pixel observed when viewing through the aperture from the viewpoint.

9. A display device comprising:
image display means having a stripe structure including subpixels of a plurality of colors disposed so that subpixels of the same color are arranged in a first direction, the image display means enabling an observer to observe, through an aperture, an image formed by pixels, each pixel being constituted by the subpixels of a plurality of colors; and
a control unit that displays a pixel of an image from a prescribed viewpoint on a pixel observed when viewing through the aperture from the viewpoint, wherein
the aperture has a shape in which areas of the subpixels of the plurality of colors which can be seen through the aperture are uniform, and in which a numerical aperture decreases along a second direction orthogonal to the first direction, and a plurality of the apertures are provided so as not to overlap with each other; and
the control unit displays an image in which parallax of an image displayed in an adjacent pixel is less than or equal to ten minutes.

10. The display device according to claim 9, wherein a center of gravity of the aperture matches or substantially matches a center of a quadrangle circumscribing the aperture.

* * * * *